(12) United States Patent
Zhang et al.

(10) Patent No.: US 10,820,316 B2
(45) Date of Patent: Oct. 27, 2020

(54) COORDINATED SLOTTED MEDIUM ACCESS FOR SHARED SPECTRUM NEW RADIO

(71) Applicant: QUALCOMM Incorporated, San Diego, CA (US)

(72) Inventors: Xiaoxia Zhang, San Diego, CA (US); Jing Sun, San Diego, CA (US); Taesang Yoo, San Diego, CA (US); Siddhartha Mallik, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 15/802,043

(22) Filed: Nov. 2, 2017

(65) Prior Publication Data

US 2018/0167941 A1 Jun. 14, 2018

Related U.S. Application Data

(60) Provisional application No. 62/431,727, filed on Dec. 8, 2016.

(51) Int. Cl.
*H04W 72/04* (2009.01)
*H04W 74/08* (2009.01)
(Continued)

(52) U.S. Cl.
CPC ....... *H04W 72/0446* (2013.01); *H04L 5/0048* (2013.01); *H04W 16/14* (2013.01);
(Continued)

(58) Field of Classification Search
None
See application file for complete search history.

(56) References Cited

U.S. PATENT DOCUMENTS 8,909,286 B2   12/2014   Grandhi et al.
9,055,542 B2    6/2015   Gage et al.
(Continued)

FOREIGN PATENT DOCUMENTS

WO   WO-2015143668 A1 * 10/2015   ........ H04W 74/0808
WO   WO-2017131860 A1    8/2017

OTHER PUBLICATIONS

Advanced Frame Structure—3GPP TSG-RAN WG1, Oct. 10-14, 2016, R1-1610132.*

(Continued)

*Primary Examiner* — Peter Chen
*Assistant Examiner* — Jeff Banthrongsack
(74) *Attorney, Agent, or Firm* — Linda G. Gunderson; Arent Fox LLP

(57) ABSTRACT

Multiple base stations, which may be controlled by different network operators, share a transmission medium to serve multiple user equipment (UE). A first base station determines that the shared communication medium is free. The first base station transmits, during a first medium access slot on the shared communication medium, a pre-grant for a first UE associated with the first base station. The first UE transmits a response message during the first medium access slot. Optionally, a second base station may join the transmission by transmitting a pre-grant to a second UE during a subsequent medium access slot.

20 Claims, 14 Drawing Sheets

(51) Int. Cl.
*H04L 5/00* (2006.01)
*H04W 16/14* (2009.01)
(52) U.S. Cl.
CPC ... *H04W 72/0413* (2013.01); *H04W 72/0426* (2013.01); *H04W 74/0808* (2013.01); *H04W 74/0816* (2013.01)

(56) References Cited

U.S. PATENT DOCUMENTS

| | | | |
|---|---|---|---|
| 2014/0036853 A1* | 2/2014 | Kim | H04W 16/14 370/329 |
| 2015/0055546 A1 | 2/2015 | Jafarian et al. | |
| 2015/0250002 A1* | 9/2015 | Sun | H04W 74/0808 370/329 |
| 2017/0055260 A1 | 2/2017 | Valliappan et al. | |

OTHER PUBLICATIONS

International Search Report and Written Opinion—PCT/US2017/059970—ISA/EPO—dated Feb. 1, 2018.
Qualcomm Incorporated: "Advanced Frame Structure", 3GPP Draft; R1-1610132, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 1, 2016, XP051159935, Retrieved from the Internet: URL:http://www.3gpp.org/ftp/tsg_ran/WG1_RL1/TSGR1_86b/Docs [retrieved on Oct. 1, 2016], 9 pages.
Qualcomm Incorporated: "Dynamic TDD Data Interference Considerations", 3GPP Draft; R1-1612094, 3rd Generation Partnership Project (3GPP), Mobile Competence Centre, 650, Route Des Lucioles, F-06921 Sophia-Antipolis Cedex, France, vol. RAN WG1, No. Reno, USA; Nov. 13, 2016, XP051176049, Retrieved from the Internet: URL:http://www.3gpp.org/ftp/Meetings_3GPP_SYNC/RAN1/Docs/ [retrieved on Nov. 13, 2016], 3 pages.
Qualcomm Incorporated: "Dynamic TDD Interference Management Considerations", 3GPP Draft; R1-1700839, 3rd Generation Partnership Project (3GPP), Mobile Competence Centre, 650, Route Des Lucioles, F-06921 Sophia-Antipolis Cedex, France, vol. RAN WG1, No. Spokane, USA; Jan. 16, 2017, XP051208358, Retrieved from the Internet: URL:http://www.3gpp.org/ftp/Meetings_3GPP_SYNC/RAN1/Docs/ [retrieved on Jan. 16, 2017], 5 pages.
Qualcomm: "NR R14 Prioritization", 3GPP Draft; RP-162478, 3rd Generation Partnership Project (3GPP), Mobile Competence Centre, 650, Route Des Lucioles, F-06921 Sophia-Antipolis Cedex, France, No. Vienna; Dec. 5, 2016, XP051183880, Retrieved from the Internet: URL:http://www.3gpp.org/ftp/Meetings_3GPP_SYNC/RAN/Docs/ [retrieved on Dec. 5, 2016], 9 pages.

\* cited by examiner

COORDINATED SLOTTED MEDIUM ACCESS FOR SHARED SPECTRUM NEW RADIO

CLAIM OF PRIORITY UNDER 35 U.S.C. § 119

This application claims priority to U.S. Provisional Application No. 62/431,727, titled "COORDINATED SLOTTED MEDIUM ACCESS FOR SHARED SPECTRUM NEW RADIO," filed Dec. 8, 2016, which is assigned to the assignee hereof, and incorporated herein by reference in its entirety.

BACKGROUND

Aspects of the present disclosure relate generally to wireless communication networks, and more particularly, to medium access control.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current medium access control solutions may not provide a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method of coordinating access to a shared communication medium in a wireless communications system. The method may include determining, by a first base station, that the shared communication medium is free. The method may include transmitting, by the first base station, a pre-grant for a first user equipment (UE) associated with the first base station during a first medium access slot of a plurality of medium access slots before a data burst of a transmission opportunity (TxOP). The method may include receiving, during an uplink portion of the first medium access slot on the shared communication medium, a first response message from the first UE.

In another aspect, the disclosure provides an apparatus for coordinating access to a shared communication medium in a wireless communications system. The apparatus may include a memory and a processor in communication with the memory. The processor may be configured to determine, at a first base station, that the shared communication medium is free. The processor may be configured to transmit, at the first base station, a pre-grant for a first UE associated with the first base station during a first medium access slot before a TxOP. The processor may be configured to receive, during the uplink portion of the first medium access slot on the shared communication medium, a first response message from the first UE.

In another aspect, the disclosure provides an apparatus for coordinating access to a shared communication medium in a wireless communications system. The apparatus may include means for determining, by a first base station, that the shared communication medium is free. The apparatus may include means for transmitting, by the first base station, a pre-grant for a first UE associated with the first base station during a first medium access slot of a plurality of medium access slots before a data burst of a TxOP. The apparatus may include means for receiving, during an uplink portion of the first medium access slot on the shared communication medium, a first response message from the first UE.

In another aspect, the disclosure provides a computer-readable medium storing computer code executable by a processor for coordinating access to a shared communication medium in a wireless communications system. The computer readable medium may include code to determine, by a first base station, that the shared communication medium is free. The computer readable medium may include code to transmit, by the first base station, a pre-grant for a first UE associated with the first base station during a first medium access slot of a plurality of medium access slots before a data burst of a TxOP. The computer readable medium may include code to receive, during an uplink portion of the first medium access slot on the shared communication medium, a first response message from the first UE.

In an aspect, the disclosure provides a method of coordinating access to a shared communication medium in a wireless communications system. The method may include determining, by a second base station, that the shared communication medium is reserved by a first base station for a TxOP. The method may include receiving, during a first medium access slot of a plurality of medium access slots on the shared communication medium, a first response message from a first UE associated with the first base station. The method may include determining, based on the first response message, that the second base station can communicate with a second UE during the TxOP without exceeding an interference threshold. The method may include transmitting a pre-grant for the second UE during a second medium access slot of the plurality of medium access slots on the shared communication medium.

In another aspect, the disclosure provides an apparatus for coordinating access to a shared communication medium in a wireless communications system. The apparatus may include a memory; and a processor in communication with the memory. The processor may be configured to determine, by a second base station, that the shared communication medium is reserved by a first base station for a TxOP. The processor may be configured to receive, during a first medium access slot of a plurality of medium access slots on the shared communication medium, a first response message from a first UE associated with the first base station. The processor may be configured to determine, based on the first response message, that the second base station can communicate with a second UE during the TxOP without exceeding an interference threshold. The processor may be configured to transmit a pre-grant for the second UE during a second medium access slot of the plurality of medium access slots on the shared communication medium.

In another aspect, the disclosure provides an apparatus for coordinating access to a shared communication medium in a wireless communications system. The apparatus may include means for determining, by a second base station, that the shared communication medium is reserved by a first base station for a TxOP. The apparatus may include means for receiving, during a first medium access slot of a plurality of medium access slots on the shared communication medium, a first response message from a first UE associated with the first base station. The apparatus may include means for determining, based on the first response message, that the second base station can communicate with a second UE during the TxOP without exceeding an interference threshold. The apparatus may include means for transmitting a pre-grant for the second UE during a second medium access slot of the plurality of medium access slots on the shared communication medium.

In another aspect, the disclosure provides a computer-readable medium storing computer code executable by a processor for coordinating access to a shared communication medium in a wireless communications system. The computer-readable medium may include code to determine, by a second base station, that the shared communication medium is reserved by a first base station for a TxOP. The computer-readable medium may include code to receive, during a first medium access slot of a plurality of medium access slots on the shared communication medium, a first response message from a first UE associated with the first base station. The computer-readable medium may include code to determine, based on the first response message, that the second base station can communicate with a second UE during the TxOP without exceeding an interference threshold. The computer-readable medium may include code to transmit a pre-grant for the second UE during a second medium access slot of the plurality of medium access slots on the shared communication medium.

In another aspect, the disclosure provides a method of coordinating access to a shared communication medium in a wireless communications system. The method may include monitoring the shared communication medium for a pre-grant from a serving base station during a first medium access slot of a plurality of medium access slots before a data burst of a TxOP. The method may include transmitting, during the first medium access slot, a response message. The method may include receiving a data grant based on the response message from the serving base station at the start of the data burst of the TxOP.

In another aspect, the disclosure provides an apparatus for coordinating access to a shared communication medium in a wireless communications system. The apparatus may include a memory and a processor in communication with the memory. The processor may be configured to monitor the shared communication medium for a pre-grant from a serving base station during a first medium access slot of a plurality of medium access slots before a data burst of a TxOP. The processor may be configured to transmit, during the first medium access slot, a response message. The processor may be configured to receive a data grant based on the response message from the serving base station at the start of the data burst of the TxOP.

In another aspect, the disclosure provides an apparatus for coordinating access to a shared communication medium in a wireless communications system. The apparatus may include means for monitoring the shared communication medium for a pre-grant from a serving base station during a first medium access slot of a plurality of medium access slots before a data burst of a TxOP. The apparatus may include means for transmitting, during the first medium access slot, a response message. The apparatus may include means for receiving a data grant based on the response message from the serving base station at the start of the data burst of the TxOP.

In another aspect, the disclosure provides a computer-readable medium storing computer code executable by a processor for coordinating access to a shared communication medium in a wireless communications system. The computer-readable medium may include code to monitor the shared communication medium for a pre-grant from a serving base station during a first medium access slot of a plurality of medium access slots before a data burst of a TxOP. The computer-readable medium may include code to transmit, during the first medium access slot, a response message. The computer-readable medium may include code to receive a data grant based on the response message from the serving base station at the start of the TxOP.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
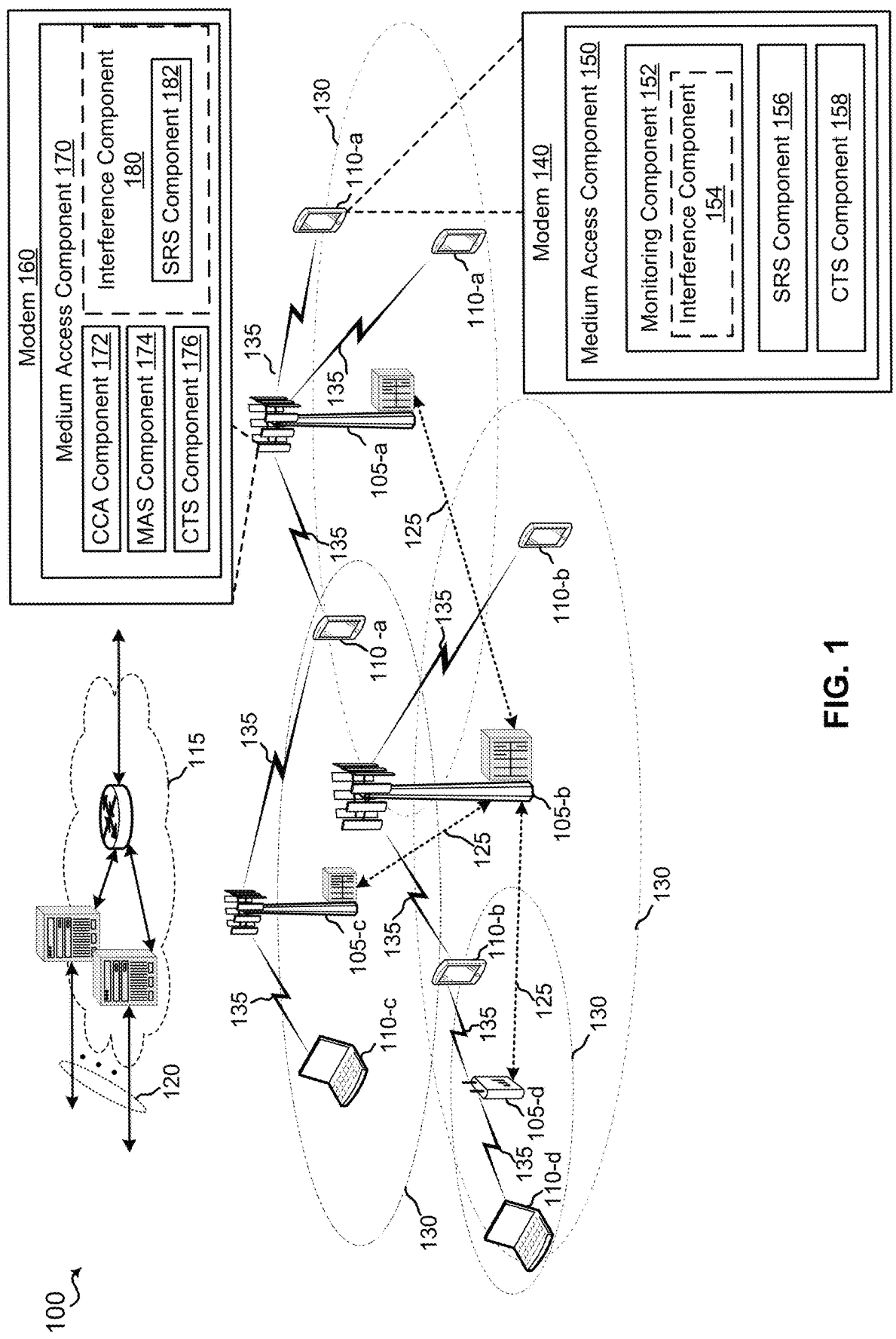
FIG. 1 is a schematic diagram of a wireless communication network including at least one user equipment (UE) having a medium access component configured according to this disclosure to provide shared access to a transmission medium.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to techniques for medium access control. According to an aspect of the disclosure, one or more medium access slots are used to coordinate access to the transmission medium among one or more network operators. A network operator may be an entity (e.g., a business) that provides a communications network for subscribers. Traditionally, network operators license a transmission medium (e.g., a frequency band) and do not share the transmission medium with other network operators. A network operator may be abbreviated OP and OP0, OP1, and OP2 may refer to different network operators who share access to a transmission medium according to an aspect of the disclosure. A base station of a first operator that wins access to the transmission medium may transmit information in a first medium access slot (MAS), the information including a transmission opportunity (TxOP) duration, a number of MASs, and pre-grants for UEs connected to the base station. During an uplink portion of the same first MAS, the UEs connected to the base station may retransmit some of the information regarding the TxOP and number of MASs. The UEs may also transmit a sounding reference signal (SRS) on resources assigned by the pre-grants during a portion of the MAS so that other devices may detect the UEs. During a second MAS, a second base station of a second operator may transmit pre-grants for UEs connected to the second base station. During the SRS portion of the second MAS, the UEs connected to the first base station and the UEs connected to the second base station may transmit an SRS on respective assigned resources. Additional operators and UEs connected to base stations of the additional operators may join the transmission in subsequent MASs.

After the number of MASs indicated by the first base station in the first MAS, the base stations or the UEs may transmit during a data burst based on information determined from the transmission in the MASs. In particular, the subsequent base stations may determine whether the subsequent base stations or their respective connected UEs are able to transmit without significantly interfering with transmissions from the first base station or the UEs connected to the first base station. For example, the subsequent base stations may determine whether potential transmissions would generate interference exceeding a threshold based on the SRS received from the UEs connected to the first base station.

The disclosed medium access control techniques may be applicable to both load based equipment (LBE) and frame based equipment (FBE). Generally, a LBE device transmits whenever the device has data to transmit and the channel is clear. In contrast, FBE devices are synchronized to a regular frame timing and only initiate transmissions at certain times within the frame. For LBE, a base station may initiate a TxOP whenever a clear channel assessment (CCA) can be successfully performed and the base station can acquire the transmission medium. For FBE, a CCA may be performed at a fixed time of a frame structure. The base station acquiring the transmission medium may provide information depending on the access type (LBE or FBE). The techniques disclosed herein may allow LBE and FBE to share the same transmission medium.

Additional features of the present aspects are described in more detail below with respect to FIGS. 1-14.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA 2000, Universal Terrestrial Radio Access (UTRA), etc. CDMA 2000 covers IS-2000, IS-95, and IS-856 standards. IS-2000 Releases 0 and A are commonly referred to as CDMA 2000 1x, 1x, etc. IS-856 (TIA-856) is commonly referred to as CDMA 2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA 2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 with a modem 140 having a medium access component 150 that coordinates medium access with other devices. Further, wireless communication network 100 includes at least one base station 105 with a modem 160 having a medium access component 170 that coordinates medium access with other devices. The other devices may include base stations and UEs of the same operator as well as base stations and UEs of other operators. Thus, according to the present disclosure, access to a shared transmission medium may be coordinated among multiple devices controlled by different operators. Devices controlled by different operators may transmit during the same data burst of a TxOP as long as interference levels remain below threshold values.

The wireless communication network 100 may include one or more base stations 105, one or more UEs 110, and a core network 115. For illustrative purposes, the base stations 105 and UEs 110 have been assigned lettered reference numbers to differentiate similar devices performing different roles based on an order in which the devices gain access to a transmission medium. For example, a first base station 105 to access the medium may be referred to as base station 105-a, and UEs served by the base station 105-a may be referred to as UE 110-a. A subsequent or second base station 105 to access the medium may be referred to as base station 105-b serving respective UE 110-b, and so on. The reference number without the letter is used to refer to a generic base station 105 or a generic UE 110. It should be appreciated, as described herein, that the order of the base stations may change for each transmission opportunity and is not limited by the illustrated examples. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a gNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), medium access control (MAC), etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communication network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Referring again to FIG. 1, the medium access component 150 of the UE 110 may include a monitoring component 152 for monitoring for a pre-grant transmitted by a serving base station or for other signals transmitted by other base stations. The monitoring component 152 may include hardware, firmware, and/or software code executable by a processor (e.g., processor(s) 1312 for monitoring for a pre-grant transmitted by a serving base station or for other signals transmitted by other base stations, the code comprising instructions and being stored in a memory (e.g., memory 1316 or another computer-readable medium). For example, the monitoring component 152 may include or control a receiver to receive the signals. The monitoring component 152 may include a processor configured to determine whether the UE 110-a has received a pre-grant from the serving base station during a first medium access slot of a plurality of medium access slots before a data burst of a TxOP. The monitoring component 152 may also monitor signals from the other base stations during one or more medium access slots.

The monitoring component 152 may optionally include an interference component 154 for determining whether the UE 110 will cause interference to the other base stations or UEs, or whether the UE 110 will suffer from interference from other base stations or UEs when the other signals are detected before the pre-grant. For example, the interference component 154 may compare the strengths of downlink pre-grants and SRS signals to thresholds to determine whether the UE 110 will cause or suffer from interference.

The medium access component 150 may also include an SRS component for transmitting an SRS signal using resources. The SRS resources may be assigned by the pre-grant or may be configured semi-statically by eNB. The medium access component 150 may also include a CTS component 158 for transmitting a CTS including a retransmission of downlink information and/or feedback to the serving base station.

The medium access component 170 at the base station 105 may include a CCA component 172 for performing a CCA procedure to determine whether a transmission medium is free. CCA component 172 may include hardware, firmware, and/or software code executable by a processor (e.g., processor(s) 1412 for monitoring for performing a CCA procedure to determine whether a transmission medium is free, the code comprising instructions and being stored in a memory (e.g., memory 1416 or another computer-readable medium). The medium access component 170 may also optionally include an interference component 180 for determining whether communications involving the base station 105 will interfere with another base station or a UE associated with another base station that is occupying the transmission medium. In an aspect, the interference component 180 may include an SRS component 182 for receiving SRS from both connected UEs connected to the base station and from UEs connected to other base stations. The interference component 180 may determine whether the base station 105 will cause interference based on the SRS signals. The medium access component 170 may also include a MAS component 174 for managing communications during a medium access slot. For example, the MAS component 174 may transmit pre-grants to UEs. The medium access component 170 may also include a CTS component 176 for receiving a CTS signal from a UE. The CTS signal may include feedback that may be useful for an upcoming transmission.

In conventional WiFi operation on unlicensed band, uncoordinated medium access is used for each node to transmit a signal. Uncoordinated medium access may work for TDM operation across nodes. It is not best suited for space division multiple access (SDMA) across nodes for better reuse where nodes could transmit simultaneously on different beams without injecting much interference. With coordinated multi-point (CoMP), uncoordinated medium access may result in reduced joint processing gain when some nodes are not able to transmit due to CCA failure caused by neighboring interference. In one proposal, coordinated/slotted medium access could be used to achieve less channel collision, allowing for more simultaneous transmission across nodes for better reuse and obtaining a higher joint processing gain. With coordinated medium access, operators/nodes sense medium at coordinated CCA opportunities. In addition, the exact CCA time does not need to be predefined. Also, both LBE and FBE may be used.

Figure 2:
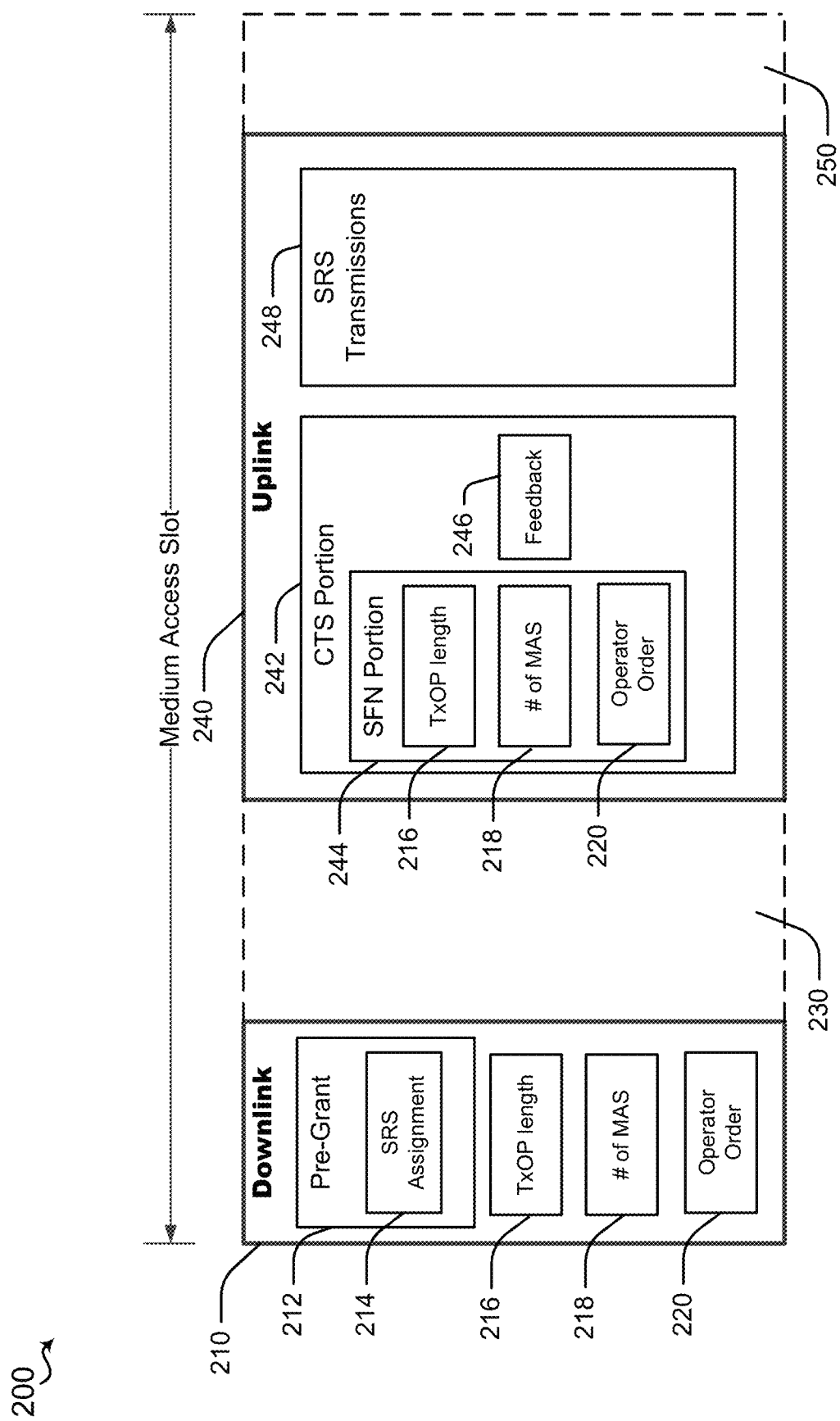
FIG. 2 is a conceptual diagram illustrating an example of a medium access slot.

Referring to FIG. 2, a medium access slot (MAS) 200 may be considered the basic unit of structure for coordinated channel access. The MAS 200 may include a downlink portion 210 and an uplink portion 240 separated by a gap 230. A second gap 250 may be located at the end of the MAS 200 and separate the MAS 200 from a subsequent MAS. The downlink portion 210 may be transmitted by a base station 105 and may include a pre-grant 212. The pre-grant 212 may include an SRS resource assignment 214 for one or more UEs 110 connected to the base station 105. Alternatively, the SRS resource for SRS may be semi-statically configured by the base station 105 and the pre-grant 212 may include a trigger to trigger the corresponding UE 110 to send SRS in the semi-statically configured resource. A UE 110 scheduled to transmit an SRS in one MAS may transmit the SRS in the same resource in following MAS without using a further grant. The scheduled UE 110 may also transmit the CTS in addition to SRS. As discussed in further detail below, the SRS transmissions from multiple UEs may be multiplexed based on resource assignments. The downlink portion 210 may also include a TxOP length 216. For example, load based equipment may transmit the TxOP length 216. In an aspect, frame based equipment may use a fixed or pre-configured TxOP length. The downlink portion 210 may also include a number of MASs 218. In an aspect, the number of MASs 218 may be determined by the base station 105 that wins access to the transmission medium. In an aspect, the downlink portion 210 of each MAS 200 may indicate the number of MASs remaining before the start of the transmission burst. Accordingly, a device that misses the first MAS but detects a subsequent MAS may determine when the TxOP will start. The downlink portion 210 may also include an operator order 220. In an aspect, the base station 105 that wins the transmission medium and transmits in the first MAS 200 may determine the order of operators to transmit in the subsequent MAS slots. Accordingly, collisions among operators may be avoided for subsequent MAS slots. Alternatively, the number of MASs 218 as well as the operator order 220 may be predefined.

The gap 230 may separate the downlink portion from the uplink portion. The gap may allow processing time and Tx/Rx switch for the base station 105 and the UEs 110.

The uplink portion 240 may include a clear to send (CTS) portion 242 and an SRS 254 transmission portion. The CTS portion 242 may include information regarding the upcoming transmission burst. In an aspect, the CTS portion 242 may include a retransmission of information from the downlink portion of the MAS as a single frequency network (SFN) portion 244. For example, the retransmission may include the TxOP length 216, the number of MASs 218, and the operator order 220. The retransmission may be a SFN transmission in which each UE 110 synchronously transmits the same contents (e.g., the same transmission from all UEs 110). The SFN transmission across UEs may improve the reliability for later base station detection and decoding of the information. In an aspect, a subsequent base station 105-*b* that joins later will use the SFN portion 244 to acquire the parameters about this TxOP decided by the first base station 105-*a*. The subsequent base station 105-*b* may indicate this information to its connected UEs 110-*b* in the downlink portion of a subsequent MAS 200 to propagate the information forward.

The CTS portion 242 may also include feedback 246 from the connected UEs to the base station. For example, the feedback 246 may include a channel quality indicator (CQI), which may be used by the base station 105 to determine transmission properties for the respective UE 110. As another example, the CTS portion 242 may have a unicast portion as well to carry UE specific information for the serving base station 105, such as a noise and interference (e.g., Nt) measurement. In an aspect, the unicast CTS portion may only be transmitted on the MAS 200 for the serving base station 105 of the UE 110.

In the uplink portion 240 in the MAS, the SRS transmission portion 248 may include a transmission from each UE 110 that is indicated to transmit or receive during the TxOP. As discussed in further detail below, the SRS transmissions may be multiplexed among UEs 110-a connected to the first base station 105-a and/or among UEs 110-b connected to other base stations 105-b. In an aspect, the SRS grant may be sticky in the sense that the SRS will be retransmitted in the future MASs 200 until the transmission burst starts. Later UEs 110-b connected to subsequent base stations 105-b may use the unused SRS interlaces and/or resources. Additionally, because the SRS may be repeated, earlier base stations 105-a may average SRS over MASs for higher processing gain. Earlier base stations 105-a can pick up later SRS transmissions to measure the channel to new UEs 110-b. The channel measurement information may be used to spatially null the new UEs 110-b during the TxOP. In the CTS portion 242 carried in the MAS 200, the SFN portion 244 might be beneficial for a subsequent base station 105-b to detect information such as the remaining number of MAS and TxOP for DL data burst. Later, the subsequent base station 105-b may forward the information to its own UEs 110-b. The non SFN part of the CTS portion 242 may be transmitted on the MAS for the respective base station (e.g., according to the operator order 220).

In each MAS 200, a UE 110 that receives a pre-grant may transmit an SRS transmission 248 at the scheduled resources. The SRS transmission 248 from different UEs may be orthogonalized. For example, frequency division multiplexing (FDM), code division multiplexing (CDM), time division multiplexing (TDM), space division multiplexing (SDM), or any combination thereof may be used to orthogonalize the SRS transmissions 248.

The SRS transmission 248 may have multiple purposes. For example, the SRS transmission 248 may act as an acknowledgement of the pre-grant for the serving base station 105. The base station 105 can also detect the unicast portion of the CTS for acknowledgement. The SRS transmission 248 may also be used for channel estimation by all base stations 105 including the serving base station, earlier base stations, and subsequent base stations. For a downlink burst, the estimated channel may be used by each base station 105 to decide the downlink beamforming and spatial nulling for the TxOP. For an uplink burst, the estimated channel may be used by a subsequent base station 105-b to determine if there is still room to join the TxOP, and to select one or more connected UEs 110-b to serve that can be spatially separated from earlier UEs 110-a. As another example purpose, the SRS transmission 248 may also occupy the channel for other base stations performing energy detection for clear channel assessment. That is, the SRS transmission may occupy the transmission medium and prevent another base station 105-b from accessing the transmission medium. Accordingly, the SRS transmission 248 may stop other base stations 105-b from initiating a new TxOP, though the other base stations 105-b may still join the current TxOP.

Figure 3:
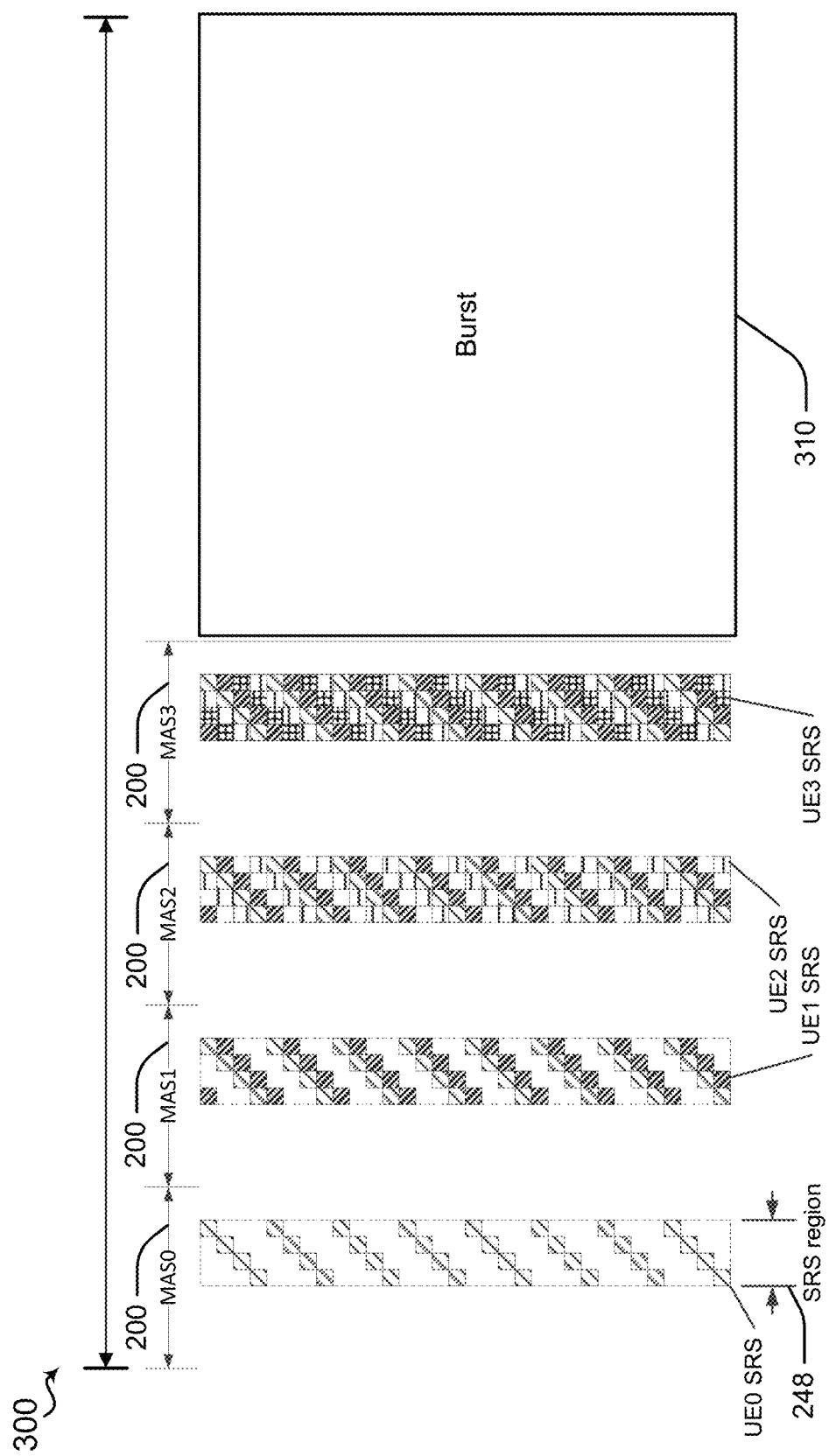
FIG. 3 is a conceptual diagram illustrating an example of resource allocation for SRS.

Referring to FIG. 3, example SRS transmissions 248 for multiple MASs 200 within a listen before talk (LBT) frame 300 are illustrated. A data burst 310 may follow the multiple MASs 200. In the illustrated example, the resources may be allocated in a resource grid, for example, in the frequency and time domains. In a first MAS 200 (MAS0), one or more UE0 connected to the first base station may transmit an SRS. The SRS transmission 248 for each UE 110 may be allocated resources that are spread over a frequency band of the transmission medium on a first interlace. The SRS transmission 248 may also hop frequency resources over time. Accordingly, the first SRS transmission 248 may occupy the transmission medium while also providing diversity. In the second MAS (MAS1), one or more UE1 connected to a second base station may join the SRS transmission 248 (UE1 SRS) using different resources. For example, the UE1 may use a second interlace that is also spread over the frequency band of the transmission medium and also hops over time. The UE0 may transmit the SRS transmission 248 in the second MAS using the same resources as in the first MAS. Similarly, in a third MAS (MAS2), one or more UE2 connected to a third base station may join the SRS transmission 248 (UE2 SRS) using a third set of resources while the UE0 and UE1 transmit using their assigned SRS resources. In a fourth SRS transmission 248 (UE3 SRS), one or more UE3 connected to a fourth base station may join the SRS transmission 248 using a fourth set of resources while the UE0, UE1, and UE2 transmit using their respective assigned resources. The number of sets of resources (e.g., interlaces) may depend on the number of MASs 218. In the last MAS 200, all available resources may be utilized for the SRS transmissions 248. However, if a subsequent base station 105 or UE 110 does not join the TxOP (e.g., because doing so would create excessive interference) the SRS resources may not be utilized.

Figure 4:
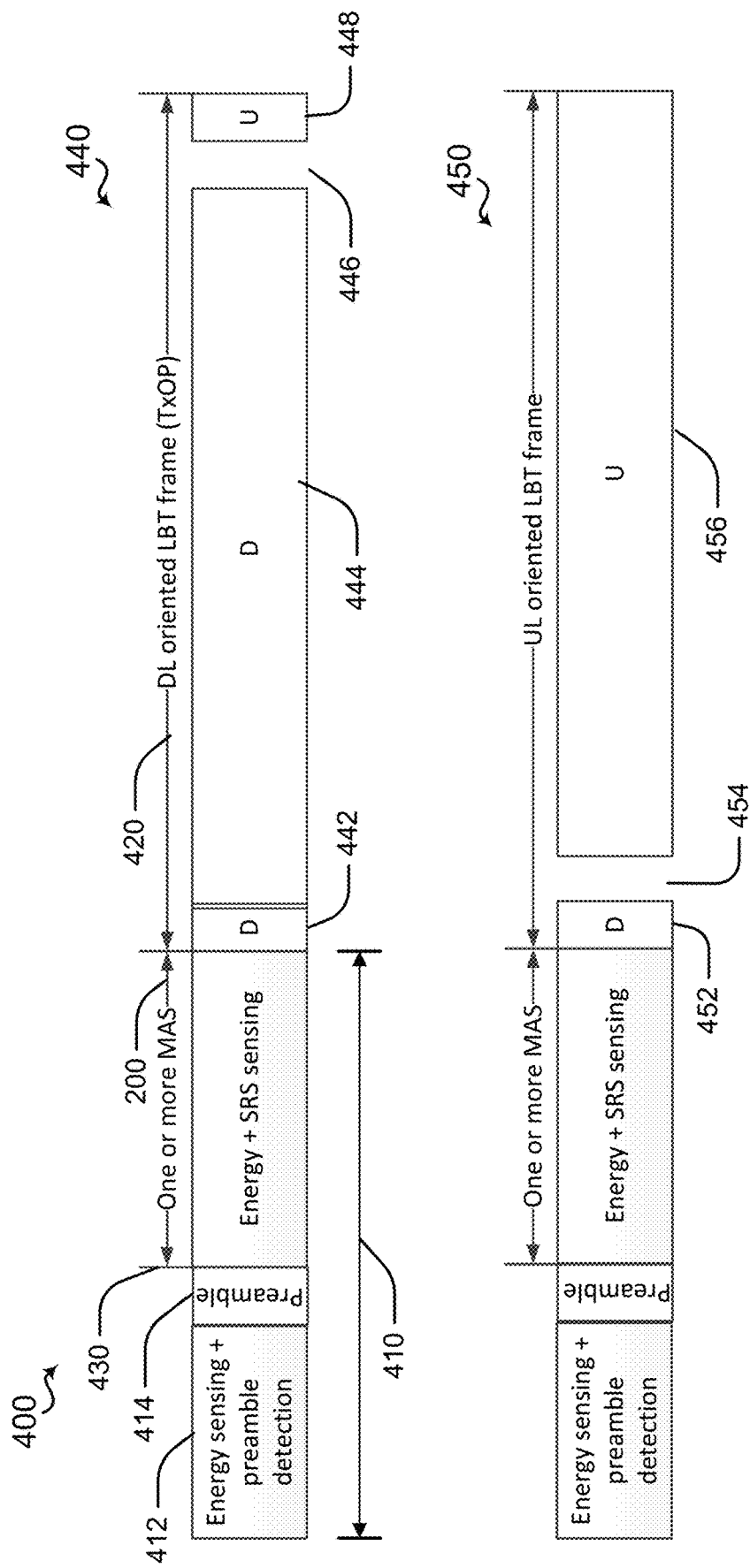
FIG. 4 is a conceptual diagram illustrating examples of frames for load based equipment including medium access slots.

Referring to FIG. 4, for example, a frame structure 400 for LBE is provided. For LBE, one or more MASs 200 may be provided in the sensing region 410 before the LBT frame starts. The MASs 200 may be transmitted at a subframe boundary 430 (or any other timing resolution agreed, e.g., sub-subframe). The base stations 105 (possibly from different operators) may be synchronized at the subframe boundary 430. The base stations may compete for the transmission medium with energy based sensing (eCCA) and preamble detection. The first base station 105-a (e.g., the eCCA winner) may decide the TxOP (how long the burst is) and how many MASs will be used or such information could be pre-configured. Accordingly, the first base station 105-a may also determine when the data burst starts. The first base station 105-a may also indicate to other base stations 105 to start additional SRS based sensing in the corresponding MASs to determine whether or not the other base stations 105 can join the TxOP. For example, a preamble 414 from OP0 may indicate two MASs with the first MAS for OP1 sensing and the second MAS for OP2 sensing.

The downlink portion of the MASs 200 for LBE may include the TxOP length 216 and the number of MASs 218 before the current TxOP. The downlink portion may also include the mapping/order of other operator to the MASs. The downlink information may be indicated in the preamble 414. If a later node detects the preamble 414 but cannot detect any SRS in the MASs 200, the later node cannot join the current TxOP.

The frame structure 400 may be used for either a downlink centric frame 440 or an uplink centric frame 450. In a downlink centric frame 440, the TxOP may include downlink control information 442, downlink data 444, a gap 446, and uplink acknowledgments 448. In an uplink centric frame 450, the TxOP may include downlink control information 452, a gap 454, and uplink data 456. An UL centric slot is a slot with majority of OFDM symbols used for UL transmission. An UL centric slot typically has a few DL symbols at the beginning (e.g. 2 symbols), then a guard duration, then UL symbols. A DL centric slot is a slot with a majority of OFDM symbols used for DL transmission. A DL centric slot typically has most of the first symbols on DL (e.g. 12 symbols), then a guard interval, then a few UL symbols (1-2 symbols).

Figure 5:
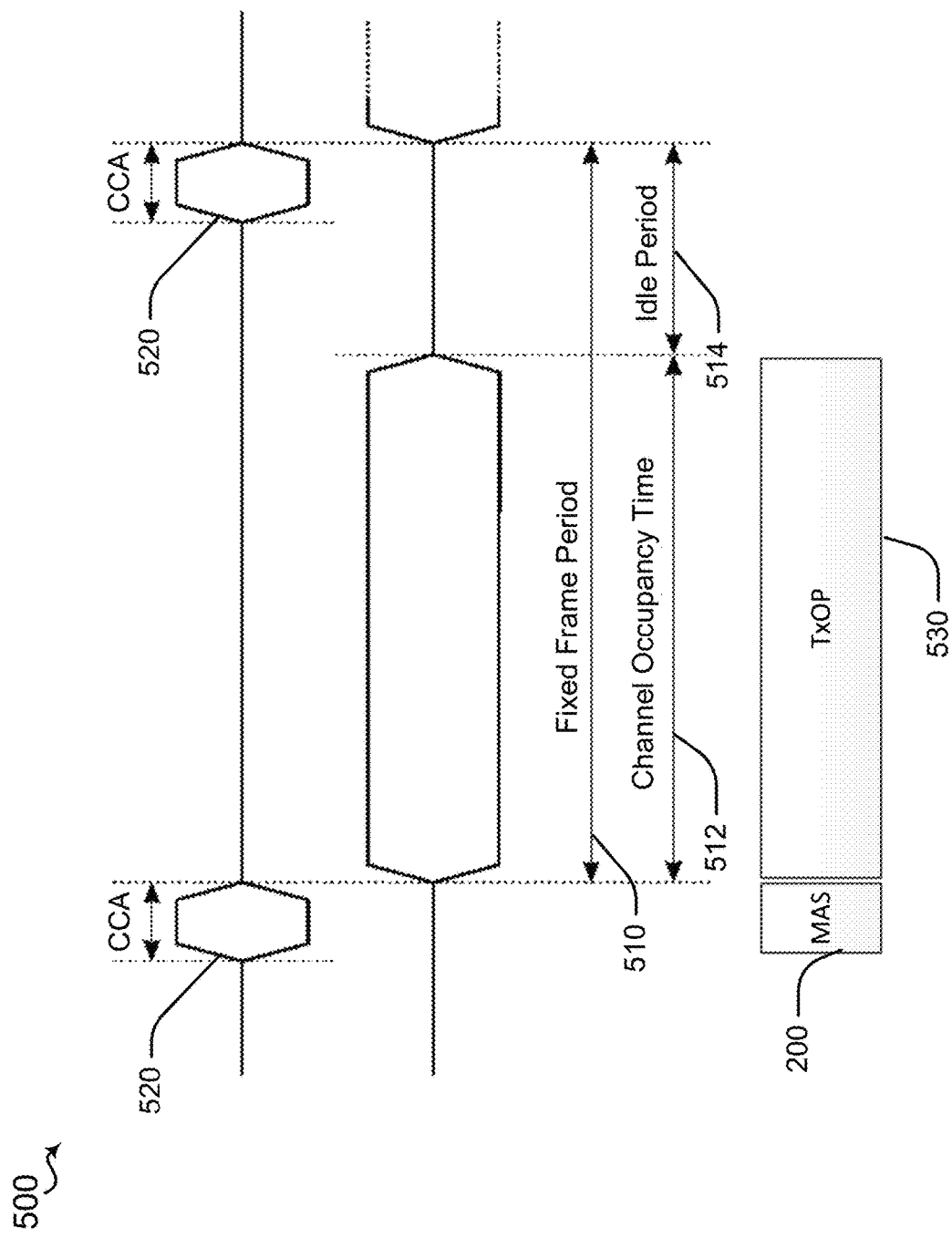
FIG. 5 is a conceptual diagram illustrating an example of a frame for frame based equipment.

Referring to FIG. 5, an example frame structure 500 for FBE is provided. In FBE, the frame structure 500 may include a fixed frame period 510 having a channel occupancy time 512 and an idle period 514. A CCA period 520 may occur during the idle period 514. In an aspect, according to the present disclosure, the MASs 200 can be placed in the CCA period 520 of the frame structure. A TxOP may occur during the channel occupancy time 512. In an aspect, for FBE, as opposed to an LBE, the frame size and start of the transmission opportunity may be fixed. Accordingly, there may be no need to carry the TxOP length 216 and number of MASs 218 information in the downlink portion 210 of the MAS. The location of the current MAS within the defined frame 500 may imply how many MASs remain after the current MAS. In one example, channel occupancy time 512 can be between 1 and 10 ms. The CCA period 520 may be ≥9 μs. The minimum idle period 514 may be 5% of occupancy, e.g., ≥100 us. The CCA threshold may be −85 dBm/MHz+(23−TxP) (TxP:max EIRP).

Figure 6:
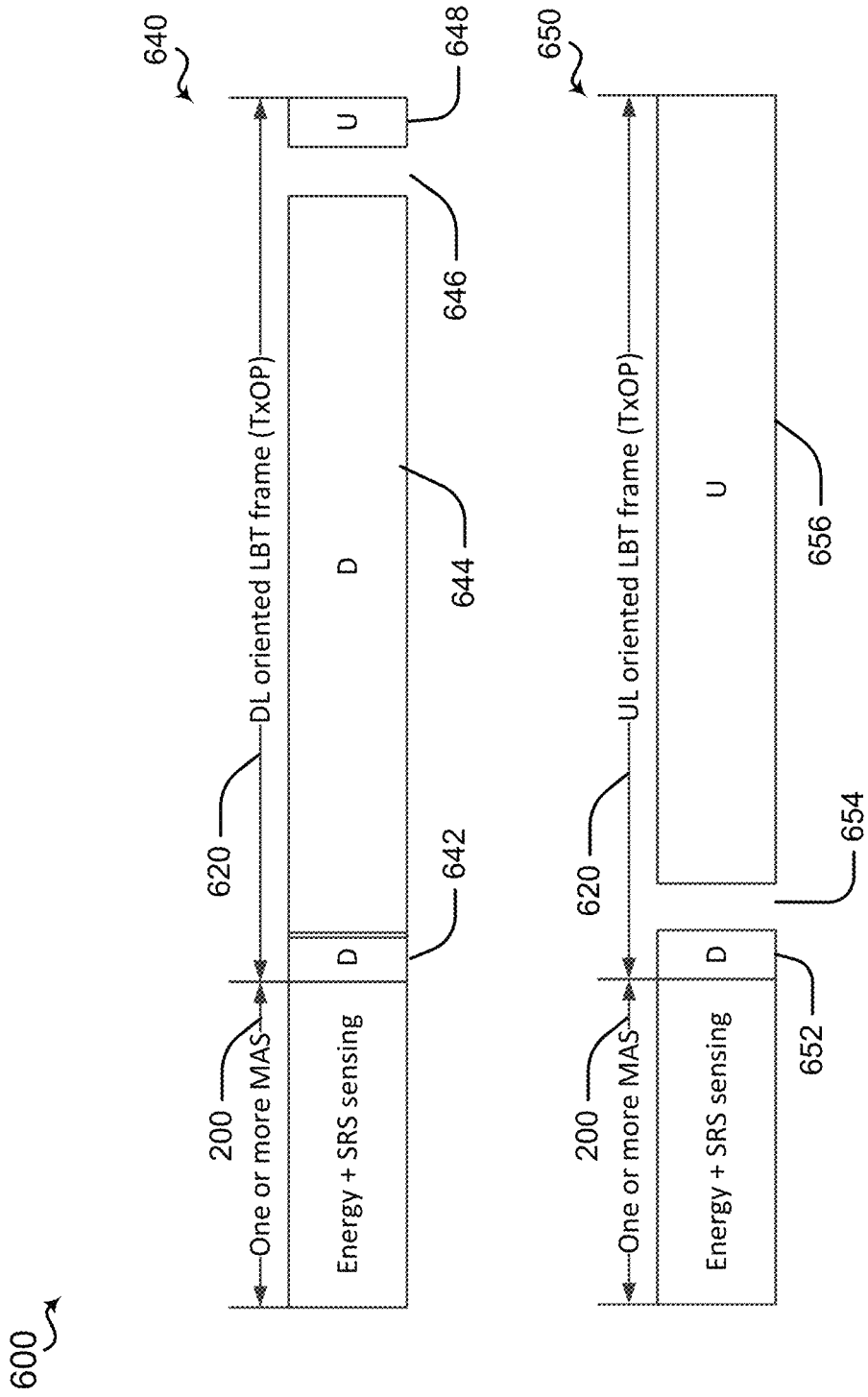
FIG. 6 is a conceptual diagram illustrating examples of frames for frame based equipment including medium access slots.

Referring to FIG. 6, another example frame structure 600 for FBE is provided. The example frame structure 600 may include one or more MASs 200 and a TxOP 620. As discussed above, the one or more MASs 200 may occur during a CCA portion of the defined FBE frame. The TxOP 620 may be similar to the transmission burst 420 for LBE. For example, in a downlink centric frame 640, the TxOP 620 may include downlink control information 642, downlink data 644, a gap 646, and uplink acknowledgments 648. In an uplink centric frame 650, the TxOP 620 may include downlink control information 652, a gap 654, and uplink data 656. If a node senses energy below the energy detection (ED) threshold, and cannot detect any SRS in the MAS, the node will take control of the current TxOP (i.e., assuming the medium is free). If a node senses energy above the ED threshold, but cannot detect any SRS in a MAS, the node cannot joint the current TxOP. If a node senses energy above the ED threshold, and can detect an SRS transmission 248 in a MAS 200, the node can join opportunistically (e.g., using a subsequent MAS).

Figure 7:
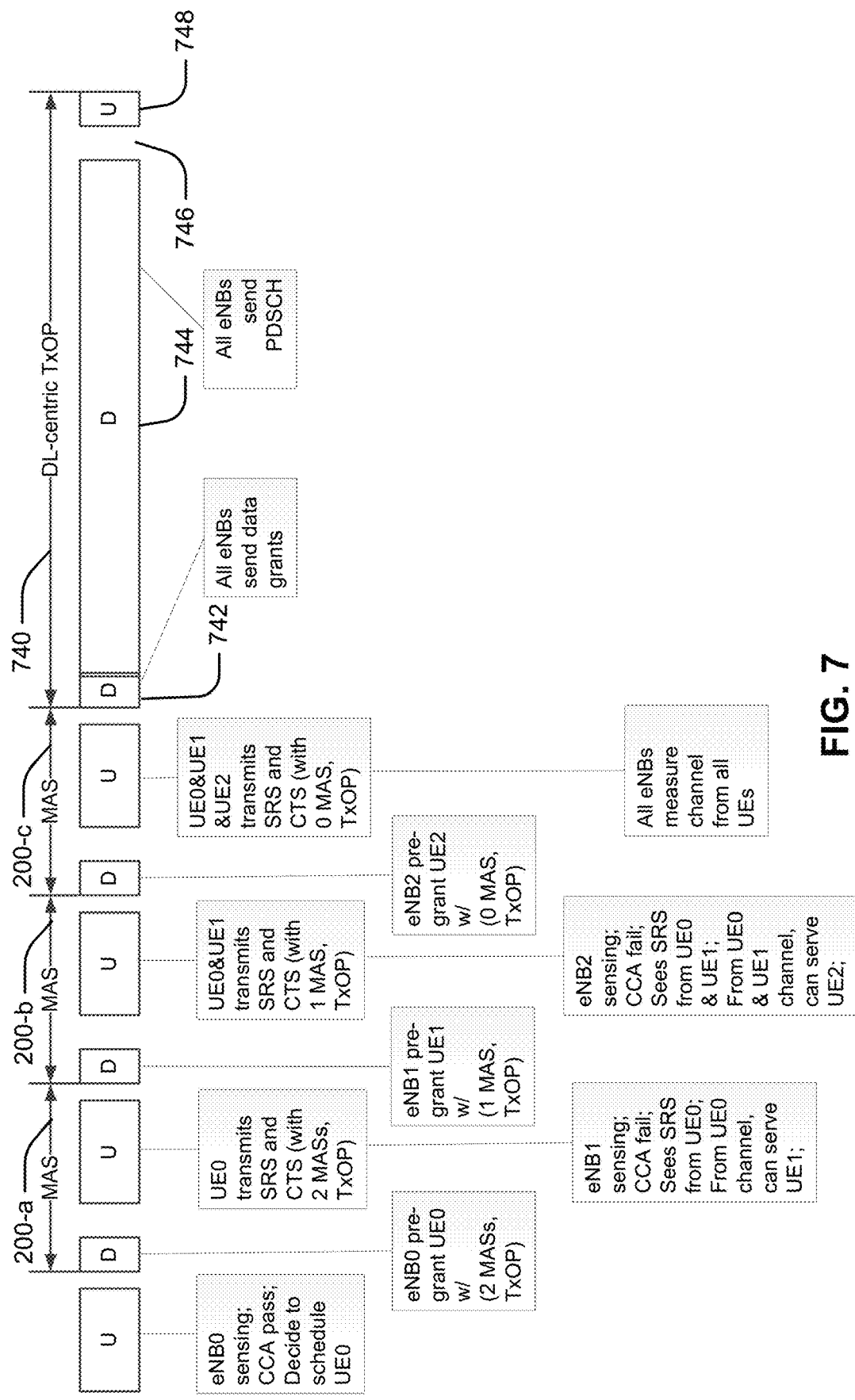
FIG. 7 is a conceptual diagram of an example of operation of a network in a downlink centric frame.

Referring to FIG. 7, a description of the operation of the base stations (e.g. base stations 105) and UEs (e.g., UEs 110) using the frame structures (e.g., frame structures 400, 500, 600) is provided. More specifically, the downlink frame structure 700 may include three MASs 200 and a downlink centric TxOP 740, which may correspond to either of downlink centric frames 440, 640. It should be understood that the ordinal numbering of the base stations and UEs may depend on the order in which the base stations 105 gain access to the transmission medium. The order may change in different LBT frames. Base stations 105 may use enhanced clear channel assessment (eCCA) to compete for the transmission medium. The winning base station 105-a will decide how many MAS slots to use and how long the TxOP is. A worst case situation is that there is no additional MAS, i.e., only one MAS slot, to collect UE SRS. If a base station 105-b did not win, the base station 105-b can still join by SRS and CTS monitoring. Base station sensing covers the uplink portion of a CCA slot. The energy detected during the uplink portion is the energy from a potential receiver. Accordingly, energy detection during the uplink portion is a form of receiver protection. The base station sensing may include, as part of the CCA, energy based sensing to determine whether the channel is clean (e.g., the energy detection threshold may be low). Base station sensing may also include SRS channel estimation. A subsequent base station 105-b may monitor all SRS resources. The subsequent base station 105-b may collect downlink or uplink channel information to already scheduled UEs 110-a from the SRS monitoring. The base station 105-b may also determine whether an un-used SRS resource can be used to provide a pre-grant to UEs 110-b connected to the subsequent base station 105-b. There may be a collision issue if two base stations 105 join at the same time and attempt to pre-grant the same SRS resource to their own UEs 110. As mentioned above, the first base station 105-a may resolve the collision issue by providing an order for additional base stations or such order could be pre-configured. The base station sensing may also include CTS decoding. The subsequent base station 105-b may collect the TxOP length 216 and the remaining number of MASs 218 from a CTS transmitted by a UE. The subsequent base station 105-b may forward the TxOP length 216 and the remaining number of MASs 218 in the downlink portion of the MAS 200 to propagate the information to the scheduled UEs 110.

If a base station 105 detects that another base station has occupied the transmission medium, the base station 105 may determine whether to join as a subsequent base station according to joining criteria. A subsequent base station 105-b can join a downlink centric TxOP if the subsequent base station 105-b can determine that transmissions from the subsequent base station 105-b will not affect reception of earlier UEs 110-a based on the uplink portion 240 of the previous MAS 200. The subsequent base station 105-b may estimate the channel based on the SRS transmissions 248 by the earlier UEs 110-a in the uplink portion 240 of a previous MAS 200. Given the estimated channel from these earlier UEs 110-a, the subsequent base station 105-b may determine if there is a way to serve one or more UEs 110-b connected to the subsequent base station 105-b while introducing only limited interference to the earlier UEs 110-a. For example, the subsequent base station 105-b may limit interference by selecting the beamforming vector that has low interference to the earlier UEs 110-a. The subsequent base station 105-b may use the previous channel estimation from the target UE 110 to determine a beamforming vector.

A subsequent base station 105-b may join an uplink burst only when it ensures minimal interference to earlier UEs 110-a, and the subsequent base station 105-b can null the earlier UEs 110-a as well to serve UEs 110-b connected to the subsequent base station 105-b.

In an aspect, a matrix may be used to determine beamforming vectors. For example the following equation, Equation (1), may be used:

$$\begin{bmatrix} y_1 \\ y_2 \end{bmatrix} = \begin{bmatrix} H_{11} & H_{12} \\ H_{21} & H_{22} \end{bmatrix} \begin{bmatrix} W_{11} & 0 \\ 0 & W_{22} \end{bmatrix} \begin{bmatrix} s_1 \\ s_2 \end{bmatrix} + \begin{bmatrix} n_1 \\ n_2 \end{bmatrix} \quad (1)$$

$H_{ij}$ may be a matrix of channels to receivers of OP i from transmitters of OP j. $W_{ii}$ may be a matrix of transmit beams for operator i. The variable $s_i$ may be the signal of interest. The variable $n_i$ may be noise. A later base station 105-b from OP2 may be able to join a TxOP using transmit beamforming to avoid interference to the UEs of OP1 when, for example, $H_{12}W_{22} \approx 0$. That is, using the beamforming vector $W_{22}$, the subsequent base station 105-b may reduce interference on the channel from OP2 to OP1. The subsequent base station 105-*b* may identify UEs 110-*b* to schedule with $H_{22}W_{22}$ satisfying a target SNR threshold with some backoff.

A UE 110 may monitor the downlink portion 210 of the MAS 200 for a pre-grant. The downlink portion 210 may contain a pre-grant 212 in the form of a cell-specific reference signal (CRS) or a physical downlink control channel (PDCCH). If the UE 110 detects a pre-grant 212, the UE 110 may transmit an SRS transmission 248 using the resources of the uplink portion 240 of the MAS 200 specified or triggered by the pre-grant 212. The UE 110 may also transmit the CTS portion 242 including a retransmission of the TxOP length 216 and the remaining number of MASs 218. After the UE 110 detects a pre-grant 212, in the following MAS 200, before the TxOP starts, the UE 110 may continue transmission of the SRS transmission 248 and SFN portion 244 of the CTS portion 242 at the specified location. That is, the allocation of resources in the pre-grant 212 may be used in each subsequent MAS 200 before the data burst of the TxOP. The UE 110, however, may only transmit feedback 246 during the CTS portion 242 of the first MAS 200 in which the UE 110 participates.

During the MASs 200, the UE 110 could also monitor for a CRS from neighbor base stations to detect their MAS activity. For an uplink grant, the UE 110 is responsible for protecting the earlier base station's receivers (e.g., UE 110-*a*) from interference because the subsequent base station 105-*b* does not know the channel from the later scheduled UE 110-*b* to the earlier base station 105-*a*. In one aspect, the UE 110 may monitor the downlink portion 210 (a.k.a. CRS portion) of each previous MAS 200. The monitoring of other downlink portions may be performed while monitoring for a grant from the UE's serving base station 105. The UE 110 may use the downlink portion 210 for the UE 110 to perform CCA (ED based), or use the CRS to identify to which earlier base stations 105 the UE may cause interference. Additionally, the UE 110 may have some prior information on the earlier base station 105-*a* (e.g., through backhaul or from its serving base station 105 via base station signaling), such as the number of base station Rx antennas. The serving base station 105 may indicate the number of scheduled UEs 110 from earlier nodes (based on SRS monitoring) for its own UEs 110 to predict if there is still spatial nulling capability remaining at an earlier base station 105-*a* (based on number of antennas) to handle this UE 110-*b*. In another aspect, the earlier base station 105-*a* may transmit a channel status information reference signal (CSI-RS) in the downlink portion 210 of the MAS 200 to allow UEs 110-*b* from later base stations 105-*b* to measure the downlink channel from earlier base station 105-*a*. The later UE 110-*b* can obtain the UL channel to an earlier base station 105-*a* based on the CSI-RS and channel reciprocity. The later UE 110-*b* may transmit if the resulting interference from this later UE 110-*b* has minimal impact to the earlier base station receivers, for example, the estimated interference is less than a specified threshold.

Referring to FIG. 7, an example of operation for the downlink centric TXOP 740 is provided. A first base station 105-*a* (e.g., eNB0) performs CCA, which passes. Accordingly, the first base station 105-*a* may obtain the transmission medium. The first base station 105-*a* may decide to schedule a first UE 110-*a* (e.g., UE0). During the first MAS 200-*a*, the first base station 105-*s* transmits a pre-grant for the first UE and indicates two additional MASs and the TxOP length. During the uplink portion of the first MAS 200-*a*, the first UE 110-*a* transmits SRS and CTS. The CTS indicates two MASs remaining and the TxOP length. A second base station 105-*b* (eNB1) may perform CCA during the first MAS 200-*a* and detect the energy from either the first base station 105-*a* or the first UE 110-*a*. Accordingly, the second base station 105-*b* may not initiate a new frame. Instead, the second base station 105-*b* measures the SRS from the first UE 110-*a* and determines, based on the measurement, whether the second base station 105-*b* can service a second UE 110-*b* (UE1). In the second MAS 200-*b*, the second base station 105-*b* may transmit a pre-grant for the second UE 110-*b* and indicates one MAS remaining and the TxOP length. In the uplink portion of the second MAS 200-*b*, the first UE 110-*a* and the second UE 110-*b* transmit SRS and CTS. The CTS may indicate one MAS remaining and the TxOP length. A third base station 105-*c* (eNB2) may perform CCA during the second MAS 200-*b* and detect the transmissions from the second base station 105-*b* or the UEs 110. The third base station 105-*c* may, therefore, determine not to initiate a new frame. Instead, the third base station 105-*c* may measure the SRS from the first UE 110-*a* and from the second UE 110-*b* and determine, based on the measurements, whether the third base station 105-*c* can serve a third UE 110-*c* (UE2). In the third MAS 200-*c*, the third base station 105-*c* may transmit a pre-grant for the third UE 110-*c* and indicate no remaining MAS and the TxOP length. In the uplink portion of the third MAS 200-*c*, the first UE 110-*a*, second UE 110-*b*, and third UE 110-*c* may transmit SRS and CTS. The CTS may indicate no remaining MAS and the TxOP length. All of the base stations 105 may measure channels based on the SRS in the third MAS.

At the start of the TxOP 730, all of the base stations 105 may transmit a downlink control channel 742 including data grants. The data grants may provide information for the UEs 110 to decode downlink transmissions. In the downlink data portion 744, all of the active base stations 105 may transmit a physical downlink shared channel (PDSCH) carrying downlink data. All of the UEs 110 may receive and decode the transmission from their respective base stations 105. After a gap 746, each of the UEs 110 may transmit an uplink acknowledgement 748 indicating whether the downlink data transmission was received.

Figure 8:
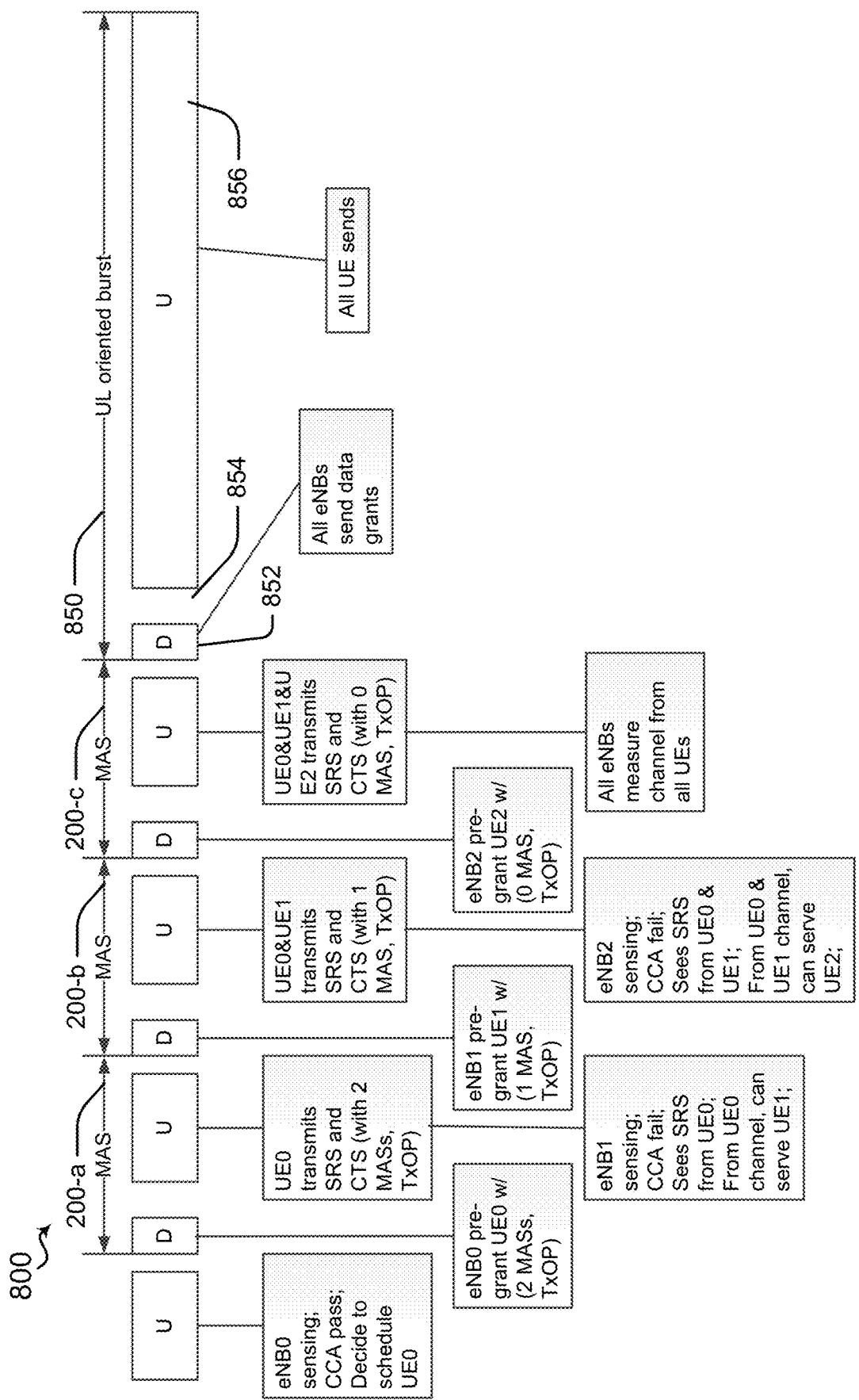
FIG. 8 is a conceptual diagram of an example of operation of a network in an uplink centric frame.

Referring to FIG. 8, an example of operation for an uplink centric frame 850, which may correspond to either uplink centric frame 450, 650, is provided. A first base station 105-*a* (eNB0) performs CCA, which passes. Accordingly, the first base station 105-*a* may obtain the transmission medium. The first base station 105-*a* may decide to schedule a first UE 110-*a* (UE0). During the first MAS 200-*a*, the first base station 105-*a* transmits a pre-grant for the first UE 110-*a* and indicates two additional MASs and the TxOP length. During the uplink portion of the first MAS 200-*a*, the first UE 110-*a* transmits SRS and CTS. The CTS indicates two MASs remaining and the TxOP length. A second base station 105-*b* (eNB1) may perform CCA during the first MAS 200-*a* and detect the energy from either the first base station 105-*a* or the first UE 110-*a*. Accordingly, the second base station 105-*b* may not initiate a new frame. Instead, the second base station 105-*b* measures the SRS from the first UE 110-*a* and determines, based on the measurement as well as the nulling capability of the first base station 105-*a* (e.g., based on the number of scheduled UEs as well as the number of Rx antennas on the first base station), whether the second base station 105-*b* can service a second UE 110-*b* (UE1). In the second MAS 200-*b*, the second base station 105-*b* may transmit a pre-grant for the second UE 110-*b* and indicates one MAS remaining and the TxOP length. In the uplink portion of the second MAS 200-*b*, the first UE 110-*a* and the second UE 110-*b* transmit SRS and CTS. The CTS may indicate one MAS remaining and the TxOP length. A third base station 105-*c* (eNB2) may perform CCA during the second MAS and detect the transmissions from the second base station 105-*b* or the UEs 110. The third base station 105-*c* may, therefore, determine not to initiate a new frame. Instead, the third base station 105-*c* may measure the SRS from the first UE 110-*a* and from the second UE 110-*b* and determine, based on the measurements as well as the nulling capability for both the first base station 105-*a* and the second base station 105-*b* with both the first UE 110-*a* and the second UE 110-*b*, whether the third base station 105-*c* can serve a third UE 110-*c* (UE2). In the third MAS 200-*c*, the third base station 105-*c* may transmit a pre-grant for the third UE 110-*c* and indicate no remaining MAS and the TxOP length. In the uplink portion of the third MAS 200-*c*, the first UE 110-*a*, second UE 110-*b*, and third UE 110-*c* may transmit SRS and CTS. The CTS may indicate no remaining MAS and the TxOP length. All of the base stations 105 may measure channels based on the SRS in the third MAS.

At the start of the TxOP 830, all of the base stations 105 may transmit a downlink control channel 842 including data grants. The data grants may provide resource assignments for the UEs 110 to use for uplink transmissions. After the gap 854, each of the UEs 110 may transmit an uplink data transmission 856 using the assigned resources.

Figure 9:
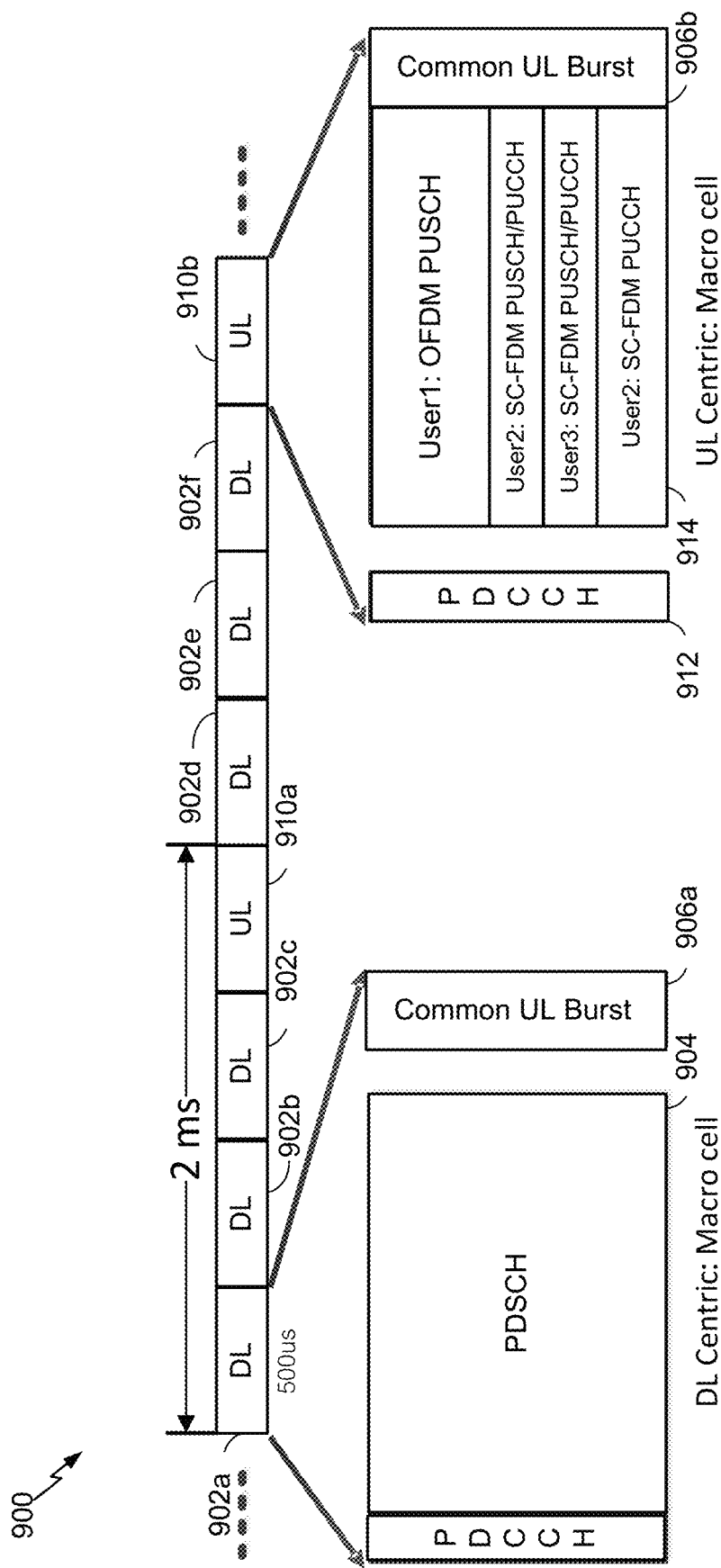
FIG. 9 is a schematic diagram illustrating an example transmission timeline that may be used in a TDD system in which one or more aspects of the present disclosure may be practiced.

FIG. 9 shows another exemplary transmission timeline 900 that may be used in a TDD system in which one or more aspects of the present disclosure may be practiced. The timeline includes a plurality DL centric slots 902 (e.g., subframes) that have most symbols 904 dedicated to DL transmissions (e.g., from a BS to a UE) and a common UL burst 906 at the end with very limited resources dedicated to UL transmissions (e.g., from a UE to a BS). The timeline also includes a plurality of UL centric slots 910 (e.g., subframes) that each have a DL symbol 912 at the beginning of the slot, but the remaining symbols 914 of the slot are dedicated to UL transmissions. As seen in the UL centric slot 910-*b*, the UL symbols 914 may be allocated to various users (e.g., UEs) for a variety of UL transmissions (e.g., OFDM PUSCH, SC-FDM PUSCH, SC-FDM PUCCH, OFDM PUCCH). Similarly, while not shown, the DL symbols 904 of a DL centric slot 902 may be allocated for a variety of DL transmissions (e.g., PDCCH, PDSCH) to one or more UEs.

Figure 10:
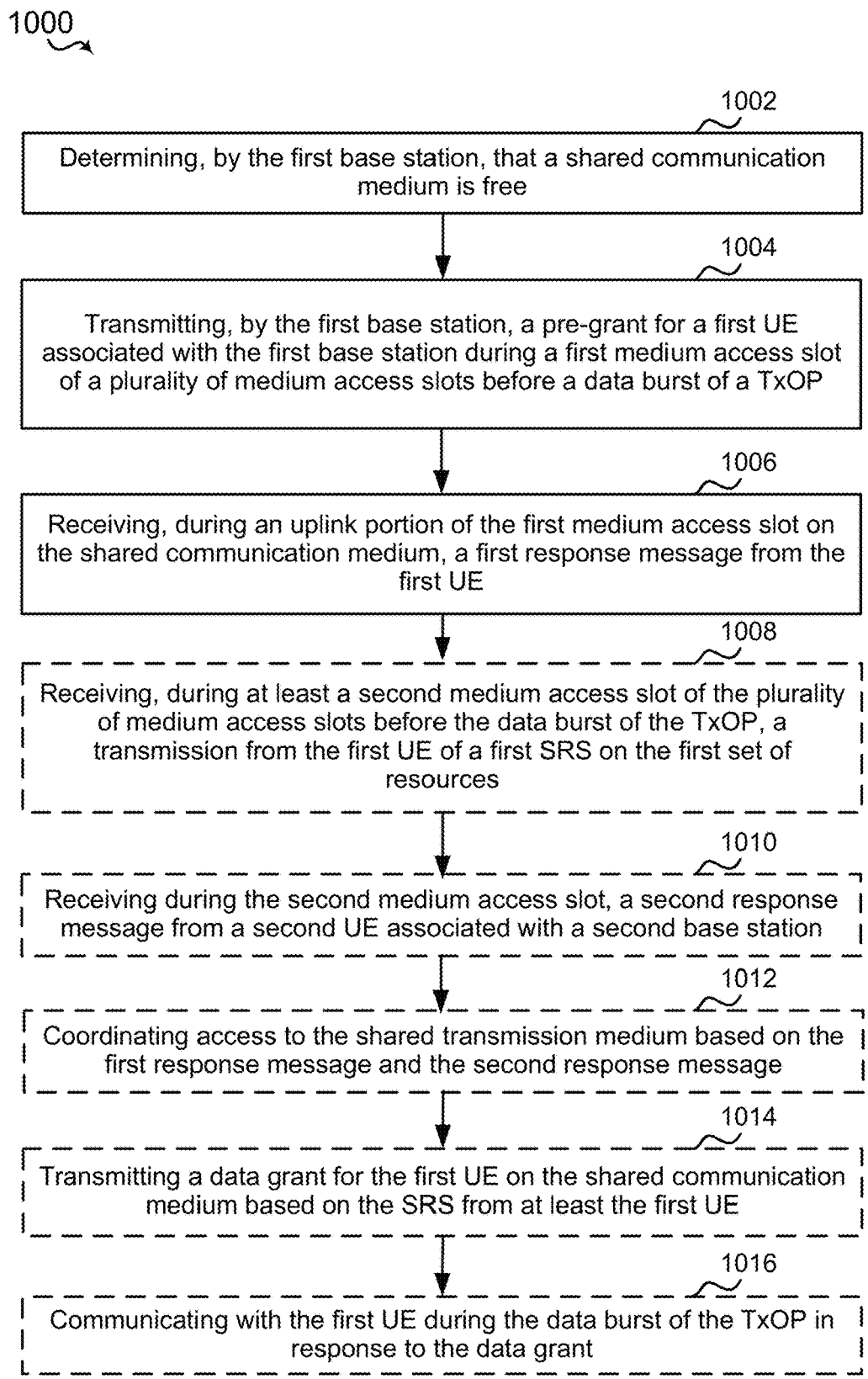
FIG. 10 is a flowchart illustrating an example of a method of medium access control for a first base station.

FIG. 10 illustrates a flowchart showing an example method 1000 for wireless communications for operating a first base station 105-*a* according to the above-described aspects to coordinate access to the transmission medium among one or more network operators. The method 1000 may include one or more of the herein-defined actions. Optional blocks are illustrated with dashed lines.

For example, at block 1002, the method 1000 may include determining, by the first base station, that a shared communication medium is free. For instance, in an aspect, base station 105 may execute the CCA component 172 to determine that a shared communication medium is free, as described herein.

In block 1004, the method 1000 may include transmitting, by the first base station, a pre-grant for a first UE associated with the first base station during a first medium access slot before a data burst of a TxOP on the shared communication medium. In an aspect, for example, the base station 105 may execute the MAS component 174 to transmit the pre-grant for the first UE associated with the first base station during the first medium access slot 200 on the shared communication medium.

In block 1006, the method 1000 may include receiving, during an uplink portion of the first medium access slot on the shared communication medium, a first response message from the first UE. The first response message may optionally include a first SRS and/or a CTS message from the first UE. The SRS may use a first set of resources indicated by the pre-grant. In an aspect, for example, the base station 105 may execute the SRS component 182 to receive the response message including an SRS as described herein and execute the CTS component 176 to receive a response message including a CTS message as described herein.

In block 1008, the method 1000 may optionally include receiving, during at least a second medium access slot, a transmission from the first UE including the first SRS on the first set of resources. In an aspect, for example, the base station 105 may execute the SRS component 182 to receive the transmission from the first UE 110 of the first response message including the first SRS 248 on the first set of resources.

In block 1010, the method 1000 may optionally include receiving, during the second medium access slot, a second transmission from a second UE associated with a different second base station. The second transmission may include an SRS using different resources than the retransmission from the first UE. In an aspect, for example, the base station 105 may execute the SRS component 182 to receive, during the second medium access slot, the second SRS transmission from the second UE associated with the different second base station.

In block 1012, the method 1000 may include coordinating access to the shared transmission medium based on the first response message and the second response message. In an aspect, for example, the base station 105 may execute the interference component 180 to coordinate access to the shared transmission medium based on the first response message and the second response message. For example, the interference component 180 may determine a beam that minimizes interference.

In block 1014, the method 1000 may optionally include transmitting a data grant for the first UE on the shared communication medium based on the SRS from at least the first UE. In an aspect, for example, the base station 105 may execute the medium access component 170 to transmit the data grant for the first UE 110 on the shared communication medium based on the SRS from at least the first UE.

In block 1016, the method 1000 may optionally include communicating with the first UE during the TxOP in response to the data grant. In an aspect, for example, the base station 105 may execute the modem 160 to communicate with the first UE during the TxOP in response to the data grant.

Figure 11:
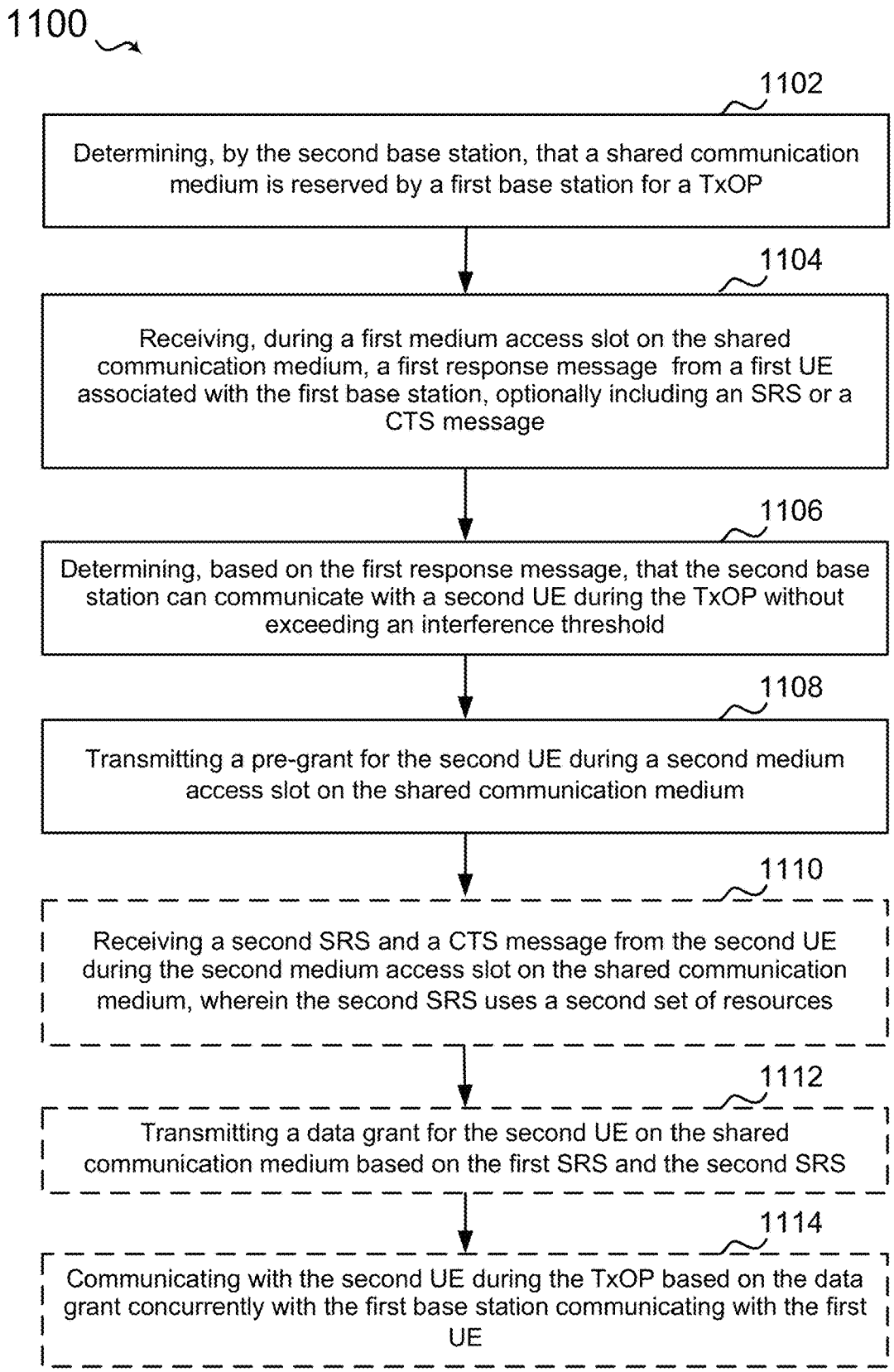
FIG. 11 is a flowchart illustrating an example of a method of medium access control for a second base station.

FIG. 11 illustrates a flowchart showing an example method 1100 for wireless communications for operating a second base station 105-*b* according to the above-described aspects to coordinate access to a transmission medium among one or more network operators. The method 1100 may include one or more of the herein-defined actions. Optional blocks are illustrated with dashed lines.

For example, at block 1102, the method 1100 may include determining, by the second base station, that a shared communication medium is reserved by a first base station for a TxOP. In an aspect, for example, the base station 105-*b* may control the CCA component 172 to determine that the shared communication medium is reserved by the first base station 105-*a* for the TxOP, as described herein. For example, the CCA component 172 may detect the downlink portion of a MAS 200 or a CTS portion 242 transmitted by a UE 110-*a* during a CCA procedure.

In block 1104, the method 1100 may include receiving, during a first medium access slot on the shared communication medium, a first response message from a first UE associated with the first base station. The first response message may optionally include a first SRS and/or a CTS message. The first SRS may use a first set of resources. In an aspect, for example, the base station 105-*b* may execute the SRS component 182 to receive, during the first MAS 200-*a*, a response message including the first SRS 248 and execute the CTS component 176 to receive a response message including the CTS portion 242, as described herein.

In block 1106, the method 1100 may include determining, based on the first response message, that the second base station can communicate with a second UE during the data burst of the TxOP without exceeding an interference threshold. In an aspect, for example, the base station 105-*b* may execute the interference component 180 to determine, based on the first SRS 248, that the second base station 105-*b* can communicate with the second UE 110-*b* during the data burst of the TxOP without exceeding the interference threshold.

In block 1108, the method 1100 may include transmitting a pre-grant for the second UE during a second medium access slot on the shared communication medium. In an aspect, for example, the base station 105 may execute the MAS component 174 to transmit the pre-grant 212 for the second UE 110-*b* during the second medium access slot 200-*b* on the shared communication medium, as described herein.

In block 1110, the method 1100 may optionally include receiving a second SRS and a CTS message from the second UE during the second medium access slot on the shared communication medium. The second SRS may use a second set of resources. In an aspect, for example, the base station 105-*b* may control the SRS component 182 to receive the second SRS 248 and the CTS portion 242 from the second UE 110-*b* during the second medium access slot 200-*b* on the shared communication medium.

In block 1112, the method 1100 may optionally include transmitting a data grant for the second UE on the shared communication medium based on the first SRS and the second SRS. In an aspect, for example, the base station 105 may execute the medium access component 170 transmit the data grant (e.g., downlink control information 442, 452) for the second UE on the shared communication medium based on the first SRS and the second SRS.

In block 1114, the method 1100 may optionally include communicating with the second UE during the TxOP based on the data grant concurrently with the first base station communicating with the first UE. In an aspect, for example, the base station 105-*b* may control the modem 160 to communicate with the second UE 110-*b* during the data burst of the TxOP based on the data grant concurrently with the first base station 105-*a* communicating with the first UE 110-*a*.

Figure 12:
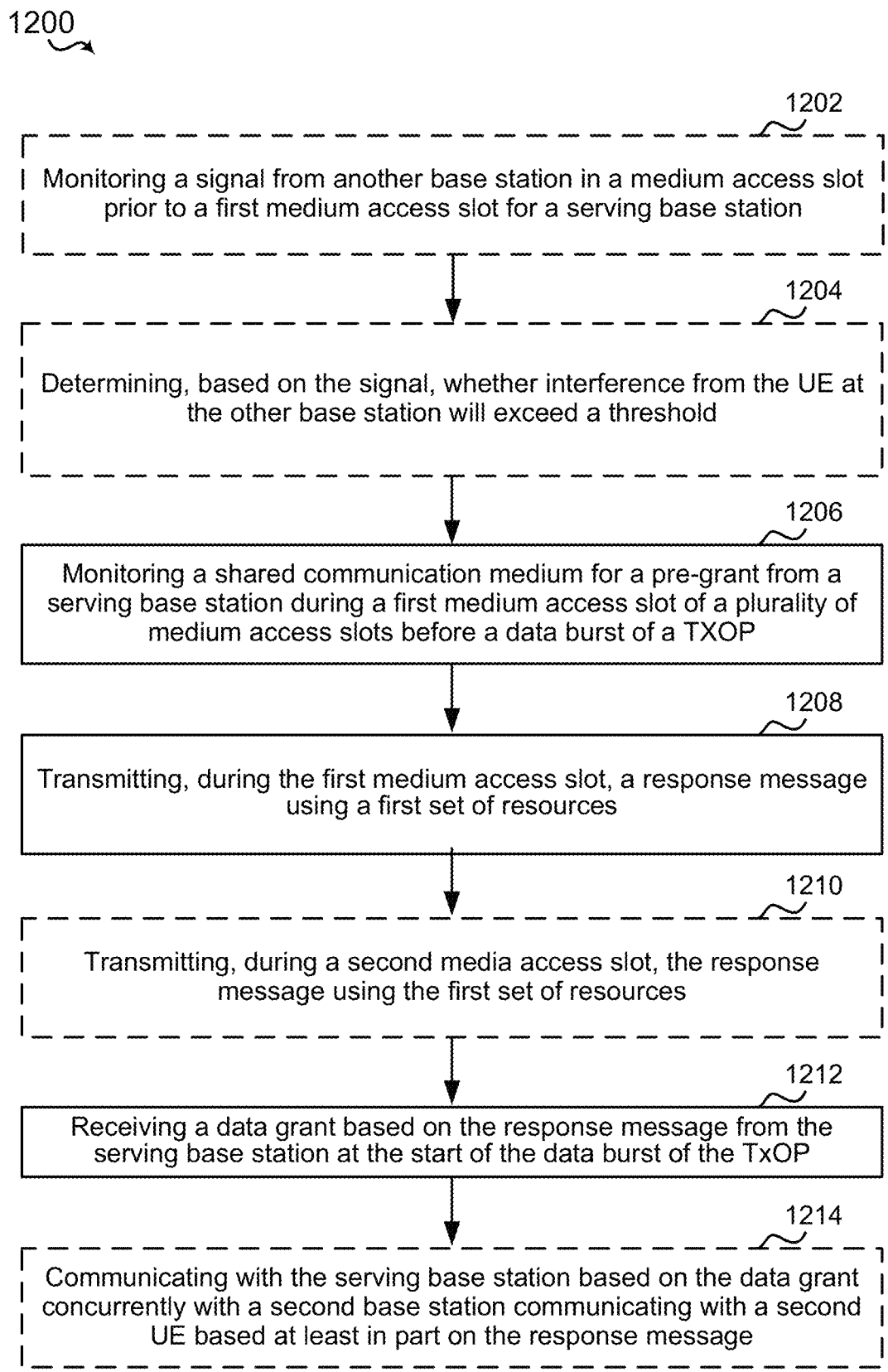
FIG. 12 is a flowchart illustrating an example of a method of medium access control for a UE.

FIG. 12 illustrates a flowchart showing a method 1200 of wireless communication in operating UE 110 according to the above-described aspects to coordinate access to the transmission medium among one or more network operators includes one or more of the herein-defined actions. Optional blocks are illustrated with dashed lines.

For example, in block 1202, the method 1200 may optionally include monitoring a signal from another base station in a medium access slot prior to a first medium access slot for a serving base station. In an aspect, for example, the UE 110 may execute the monitoring component 152 to monitor the signal from the other base station in the medium access slot prior to the first medium access slot for the serving base station, as described herein.

In block 1204, the method 1200 may optionally include determining, based on the signal, whether interference from the UE at the other base station will exceed a threshold. In an aspect, for example, the UE 110 may control the interference component 154 to determine, based on the signal, whether interference from the UE at the other base station will exceed a threshold.

In block 1206, the method 1200 may include monitoring a shared communication medium for a pre-grant from a serving base station during a first medium access slot. In an aspect, for example, the UE 110 may execute the monitoring component 152 to monitor the shared communication medium for the pre-grant from the serving base station during the first medium access slot. The pre-grant may optionally indicate a first set of resources for the UE to transmit a SRS. Alternatively, the first set of resources may be semi-statically configured and the pre-grant may trigger first SRS transmission using the first set of resources.

In block 1208, the method 1200 may include transmitting, during the first medium access slot, a response message using the first set of resources. In an aspect, for example, the UE 110 may execute the SRS component 156 to transmit, during the first medium access slot, the response message using the first set of resources, as described herein.

In block 1210, the method 1200 may optionally include transmitting, during a second medium access slot, the response message including the SRS using the first set of resources. In an aspect, for example, the UE 110 may execute the SRS component 156 to transmit, during the second medium access slot, the response message including the SRS using the first set of resources, as described herein.

In block 1212, the method 1200 may include receiving a data grant based on the response message from the serving base station at the start of the TxOP. In an aspect, for example, the UE 110 may execute the medium access component 150 to receive the data grant based on the response message from the serving base station at the start of the TxOP, as described herein.

In block 1214, the method 1200 may optionally include communicating with the serving base station based on the data grant concurrently with a second base station communicating with a second UE based at least in part on the response message. In an aspect, for example, the UE 110 may control the modem 140 to communicate with the serving base station based on the data grant concurrently with the second base station communicating with the second UE based at least in part on the response message.

Figure 13:
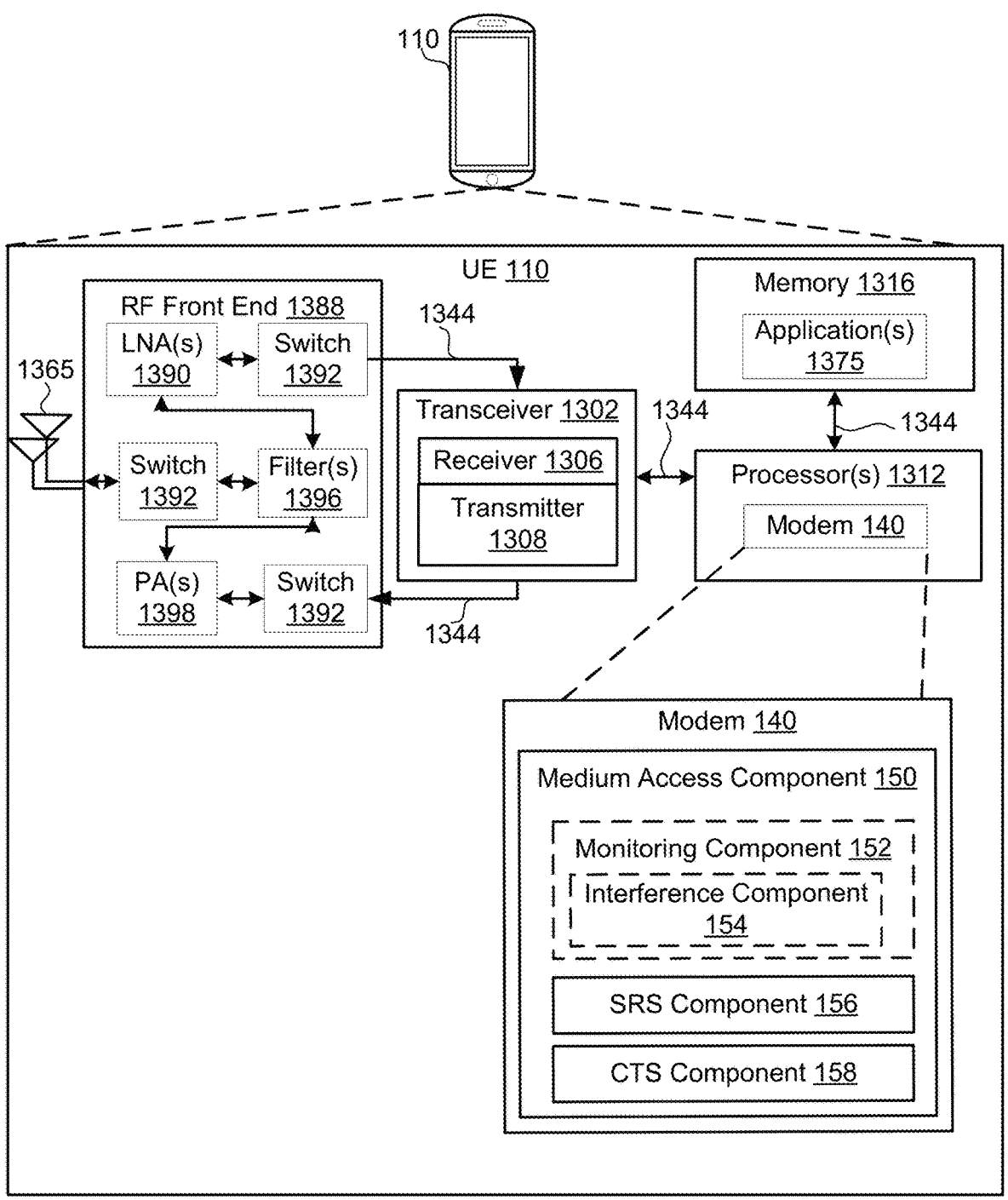
FIG. 13 is a schematic diagram illustrating examples of components of the UE of FIG. 1.

Referring to FIG. 13, one example of an implementation of UE 110 may include a variety of components, some of which have already been described above, but including components such as one or more processors 1312 and memory 1316 and transceiver 1302 in communication via one or more buses 1344, which may operate in conjunction with modem 140 and medium access component 150 to enable one or more of the functions described herein related to coordinating access to the transmission medium among one or more network operators. Further, the one or more processors 1312, modem 1314, memory 1316, transceiver 1302, RF front end 1388 and one or more antennas 1386, may be configured to support voice and/or data calls (simultaneously or non-simultaneously) in one or more radio access technologies.

In an aspect, the one or more processors 1312 can include a modem 140 that uses one or more modem processors. The various functions related to medium access component 150 may be included in modem 140 and/or processors 1312 and, in an aspect, can be executed by a single processor, while in other aspects, different ones of the functions may be executed by a combination of two or more different processors. For example, in an aspect, the one or more processors 1312 may include any one or any combination of a modem processor, or a baseband processor, or a digital signal processor, or a transmit processor, or a receiver processor, or a transceiver processor associated with transceiver 1302. In other aspects, some of the features of the one or more processors 1312 and/or modem 140 associated with medium access component 150 may be performed by transceiver 1302.

Also, memory 1316 may be configured to store data used herein and/or local versions of applications 1375 or medium access component 150 and/or one or more of its subcomponents being executed by at least one processor 1312. Memory 1316 can include any type of computer-readable medium usable by a computer or at least one processor 1312, such as random access memory (RAM), read only memory (ROM), tapes, magnetic discs, optical discs, volatile memory, non-volatile memory, and any combination thereof. In an aspect, for example, memory 1316 may be a non-transitory computer-readable storage medium that stores one or more computer-executable codes defining medium access component 150 and/or one or more of its subcomponents, and/or data associated therewith, when UE 110 is operating at least one processor 1312 to execute medium access component 150 and/or one or more of its subcomponents.

Transceiver 1302 may include at least one receiver 1306 and at least one transmitter 1308. Receiver 1306 may include hardware, firmware, and/or software code executable by a processor for receiving data, the code comprising instructions and being stored in a memory (e.g., computer-readable medium). Receiver 1306 may be, for example, a radio frequency (RF) receiver. In an aspect, receiver 1306 may receive signals transmitted by at least one base station 105. Additionally, receiver 1306 may process such received signals, and also may obtain measurements of the signals, such as, but not limited to, Ec/Io, SNR, RSRP, RSSI, etc. Transmitter 1308 may include hardware, firmware, and/or software code executable by a processor for transmitting data, the code comprising instructions and being stored in a memory (e.g., computer-readable medium). A suitable example of transmitter 1308 may including, but is not limited to, an RF transmitter.

Moreover, in an aspect, UE 110 may include RF front end 1388, which may operate in communication with one or more antennas 1365 and transceiver 1302 for receiving and transmitting radio transmissions, for example, wireless communications transmitted by at least one base station 105 or wireless transmissions transmitted by UE 110. RF front end 1388 may be connected to one or more antennas 1365 and can include one or more low-noise amplifiers (LNAs) 1390, one or more switches 1392, one or more power amplifiers (PAs) 1398, and one or more filters 1396 for transmitting and receiving RF signals.

In an aspect, LNA 1390 can amplify a received signal at a desired output level. In an aspect, each LNA 1390 may have a specified minimum and maximum gain values. In an aspect, RF front end 1388 may use one or more switches 1392 to select a particular LNA 1390 and its specified gain value based on a desired gain value for a particular application.

Further, for example, one or more PA(s) 1398 may be used by RF front end 1388 to amplify a signal for an RF output at a desired output power level. In an aspect, each PA 1398 may have specified minimum and maximum gain values. In an aspect, RF front end 1388 may use one or more switches 1392 to select a particular PA 1398 and its specified gain value based on a desired gain value for a particular application.

Also, for example, one or more filters 1396 can be used by RF front end 1388 to filter a received signal to obtain an input RF signal. Similarly, in an aspect, for example, a respective filter 1396 can be used to filter an output from a respective PA 1398 to produce an output signal for transmission. In an aspect, each filter 1396 can be connected to a specific LNA 1390 and/or PA 1398. In an aspect, RF front end 1388 can use one or more switches 1392 to select a transmit or receive path using a specified filter 1396, LNA 1390, and/or PA 1398, based on a configuration as specified by transceiver 1302 and/or processor 1312.

As such, transceiver 1302 may be configured to transmit and receive wireless signals through one or more antennas 1365 via RF front end 1388. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 1302 to operate at a specified frequency and power level based on the UE configuration of the UE 110 and the communication protocol used by modem 140.

In an aspect, modem 140 can be a multiband-multimode modem, which can process digital data and communicate with transceiver 1302 such that the digital data is sent and received using transceiver 1302. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 1388, transceiver 1302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 14:
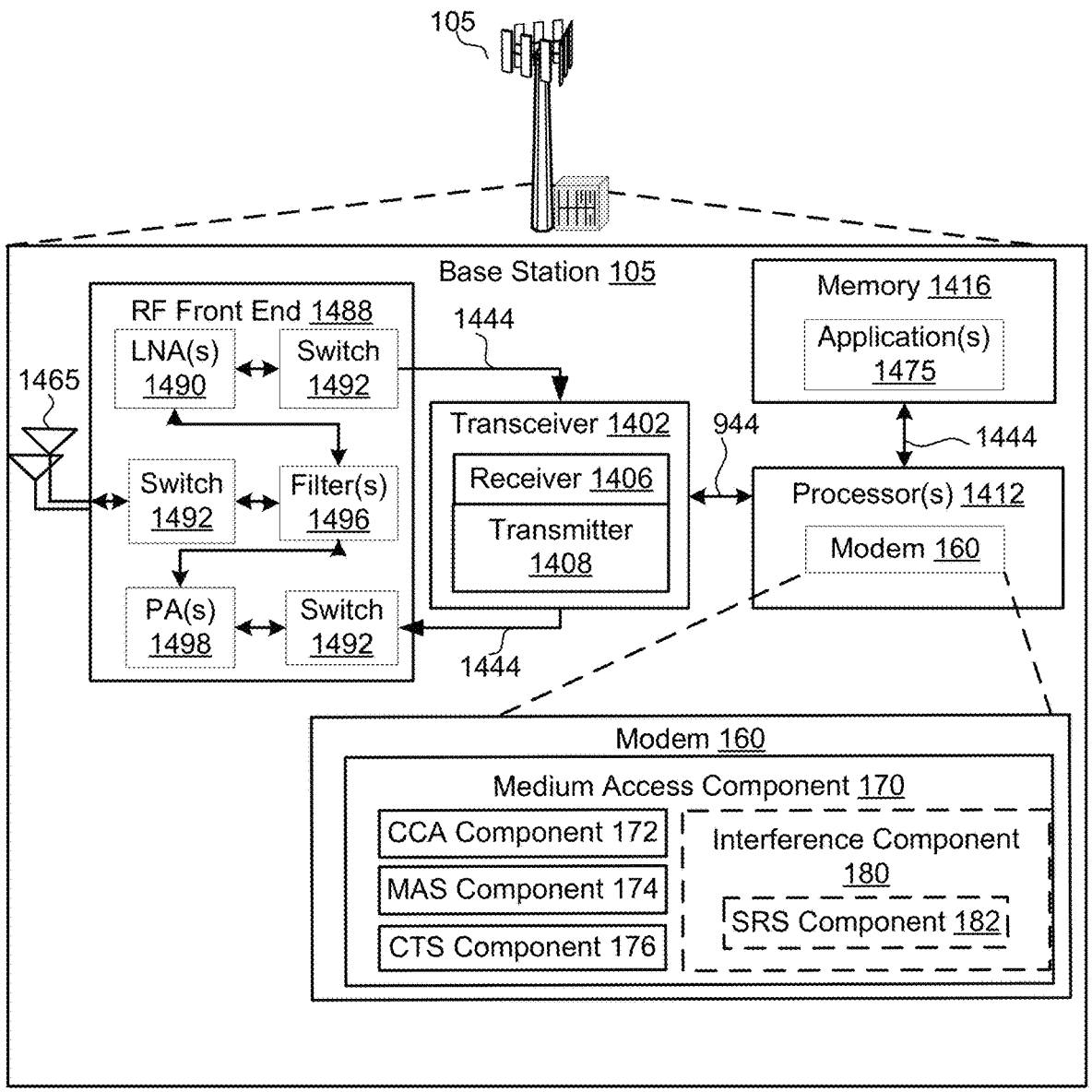
FIG. 14 is a schematic diagram illustrating examples of components of the base station of FIG. 1.

Referring to FIG. 14, one example of an implementation of base station 105 may include a variety of components, some of which have already been described above, but including components such as one or more processors 1412 and memory 1416 and transceiver 1402 in communication via one or more buses 1444, which may operate in conjunction with modem 160 and medium access component 170 to enable one or more of the functions described herein related to coordinating access to the transmission medium among one or more network operators.

The transceiver 1402, receiver 1406, transmitter 1408, one or more processors 1412, memory 1416, applications 1475, buses 1444, RF front end 1488, LNAs 1490, switches 1492, filters 1496, PAs 1498, and one or more antennas 1465 may be the same as or similar to the corresponding components of UE 110, as described above, but configured or otherwise programmed for base station operations as opposed to UE operations.

In some networks (e.g., NR or 5G networks), devices may communicate by transmitting signals in different locations of a slot, e.g., such as in DL centric slot and/or UL centric slot. A DL centric slot may be used for transmitting DL data from the base station to one or more UEs, and a UL centric slot may be used for transmitting UL data from one or more UEs to a base station. A UL centric slot is a slot with a majority of the OFDM symbols used for UL transmission. It typically has few DL symbols at the beginning (e.g. 2 symbols), then a guard duration, then UL symbols. A DL centric slot is a slot with a majority of OFDM symbols used for DL transmission. It typically has most of the first symbols on DL (e.g. 12 symbols), then a guard interval, then a few UL symbols (1-2 symbols).

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of coordinating access to a shared communication medium in a wireless communications system, comprising, by a first base station:
   determining that the shared communication medium is free;
   transmitting, on the shared communication medium, a pre-grant for a first user equipment (UE) associated with the first base station during a first medium access slot of a plurality of medium access slots before a data burst of a transmission opportunity (TxOP);
   receiving, during an uplink portion of the first medium access slot on the shared communication medium, a first response message from the first UE, wherein the first response message includes at least one of a first sounding reference signal (SRS) from the first UE or a clear to send (CTS) message wherein a first set of SRS resources is indicated by the pre-grant or the first set of SRS resources is semi-statically configured and a transmission of the first SRS is triggered by the pre-grant;

receiving, during at least a second medium access slot of the plurality of medium access slots before the data burst of the TxOP, a second transmission from the first UE of the first response message including the first SRS on the first set of SRS resources; and receiving during the second medium access slot, a second response message from a second UE associated with a second base station, wherein the second response message includes a second SRS that uses different resources than the transmission from the first UE.

2. The method according to claim 1, further comprising coordinating access to the shared communication medium based on the first response message and the second response message.

3. The method according to claim 1, further comprising:
transmitting a data grant for the first UE on the shared communication medium based on the first response message from at least the first UE; and
communicating with the first UE during the data burst of the TxOP in response to the data grant.

4. The method according to claim 1, wherein the first medium access slot is for energy and channel sensing before the TXOP on the shared communication medium, the first medium access slot including a downlink portion including the pre-grant and an uplink portion in which one or more UEs transmit a response message, wherein the downlink portion and the uplink portion are separated by a first gap.

5. An apparatus for coordinating access to a shared communication medium at a first base station in a wireless communications system, comprising:
a memory; and
a processor in communication with the memory, wherein the processor is configured to:
determine that the shared communication medium is free;
transmit, on the shared communication medium, a pre-grant for a first user equipment (UE) associated with the first base station during a first medium access slot of a plurality of medium access slots before a data burst of a transmission opportunity (TxOP);
receive, during an uplink portion of the first medium access slot on the shared communication medium, a first response message from the first UE, wherein the first response message includes at least one of a first sounding reference signal (SRS) from the first UE or a clear to send (CTS) message, and wherein a first set of SRS resources is indicated by the pre-grant or the first set of SRS resources is semi-statically configured and a transmission of the first SRS is triggered by the pre-grant;
receive, during at least a second medium access slot before the TxOP, a second transmission from the first UE of the first response message including the first SRS on the first set of SRS resources; and
receive during the second medium access slot, a second response message from a second UE associated with a second base station, wherein the second response message includes a second SRS that uses different resources than the transmission from the first UE.

6. The apparatus according to claim 5, wherein the processor is configured to coordinate access to the shared communication medium based on the first response message and the second response message.

7. The apparatus according to claim 5, wherein the processor is configured to:
transmit a data grant for the first UE on the shared communication medium based on the first response message from at least the first UE; and
communicate with the first UE during the TxOP in response to the data grant.

8. The apparatus according to claim 5, wherein the first medium access slot is for energy and channel sensing before the TXOP on the shared communication medium, the first medium access slot including a downlink portion including the pre-grant and an uplink portion in which one or more UEs transmit a response message, wherein the downlink portion and the uplink portion are separated by a first gap.

9. A method of coordinating access to a shared communication medium in a wireless communications system, comprising, at a first user equipment (UE):
monitoring the shared communication medium for a pre-grant from a serving base station during a first medium access slot of a plurality of medium access slots before a data burst of a transmission opportunity (TxOP);
transmitting, during the first medium access slot, a first response message, wherein the first response message includes a sounding reference signal (SRS) using a first set of resources;
transmitting, during a second medium access slot of the plurality of medium access slots, the first response message using the first set of resources;
receiving a data grant based on the first response message from the serving base station at a start of the data burst of the TxOP; and
communicating with the serving base station based on the data grant concurrently with a second base station communicating with a second UE based at least in part on the SRS.

10. The method according to claim 9, wherein the first set of resources is indicated by the pre-grant or the first set of resources is semi-statically configured and a transmission of the first SRS is triggered by the pre-grant.

11. The method according to claim 9, further comprising:
monitoring a signal from another base station in a medium access slot of the plurality of medium access slots prior to the first medium access slot; and
determining, based on the signal, whether interference from the UE at the other base station will exceed a threshold.

12. The method of claim 11, further comprising:
receiving a number of base station receive antennas of the other base station; and
determining a number of scheduled UEs for the other base station, wherein the threshold is based on special nulling capability of the other base station for the number of scheduled UEs using the number of base station receive antennas.

13. The method according to claim 9, wherein the first medium access slot is for energy and channel sensing before the TxOP on the shared communication medium, the first medium access slot including a downlink portion including the pre-grant, a first gap, an uplink portion in which one or more UEs transmit a response message, and a second gap at an end of the first medium access slot.

14. The method of claim 13, wherein transmitting the response message comprises retransmitting, during the uplink portion as a single frequency network transmission, a TxOP length, a number of MASs, and an operator order received during the downlink portion.

15. An apparatus for coordinating access to a shared communication medium at a first user equipment (UE) in a wireless communications system, comprising:

a memory; and a processor in communication with the memory, wherein the processor is configured to:

monitor the shared communication medium for a pre-grant from a serving base station during a first medium access slot of a plurality of medium access slots before a data burst of a transmission opportunity (TxOP);

transmit, during the first medium access slot, a first response message, wherein the first response message includes a sounding reference signal (SRS) using a first set of resources;

transmit, during a second medium access slot of the plurality of medium access slots, the first response message using the first set of resources;

receive a data grant based on the first response message from the serving base station at a start of the data burst of the TxOP; and communicate with the serving base station based on the data grant concurrently with a second base station communicating with a second UE based at least in part on the SRS.

16. The apparatus according to claim 15, wherein the first set of resources is indicated by the pre-grant or the first set of resources is semi-statically configured and a transmission of the first SRS is triggered by the pre-grant.

17. The apparatus according to claim 15, wherein the processor is configured to:

monitor a signal from another base station in a medium access slot of the plurality of medium access slots prior to the first medium access slot; and determine, based on the signal, whether interference from the apparatus at the other base station will exceed a threshold.

18. The apparatus of claim 17, wherein the processor is configured to:

receive a number of base station receive antennas of the other base station; and determine a number of scheduled user equipment (UEs) for the other base station, wherein the threshold is based on special nulling capability of the other base station for the number of scheduled UEs using the number of base station receive antennas.

19. The apparatus according to claim 15, wherein the first medium access slot is for energy and channel sensing before the TxOP on the shared communication medium, the first medium access slot including a downlink portion including the pre-grant, a first gap, an uplink portion in which one or more UEs transmit a response message, and a second gap at an end of the first medium access slot.

20. The apparatus of claim 19, wherein the processor is configured to retransmit, during the uplink portion as a single frequency network transmission, a TxOP length, a number of MASs, and an operator order received during the downlink portion.

* * * * *